United States Patent
Fikouras et al.

(10) Patent No.: US 11,856,405 B2
(45) Date of Patent: Dec. 26, 2023

(54) ADMINISTRATION OF SUBSCRIPTION IDENTIFIERS IN A WIRELESS COMMUNICATION NETWORK

(71) Applicant: Telefonaktiebolaget LM Ericsson (publ), Stockholm (SE)

(72) Inventors: Ioannis Fikouras, Stockholm (SE); Athanasios Karapantelakis, Solna (SE); Qiang Li, Täby (SE); Leonid Mokrushin, Uppsala (SE); Konstantinos Vandikas, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/888,848

(22) Filed: Aug. 16, 2022

(65) Prior Publication Data
US 2022/0394483 A1    Dec. 8, 2022

Related U.S. Application Data

(62) Division of application No. 17/047,546, filed as application No. PCT/SE2018/050425 on Apr. 25, 2018, now Pat. No. 11,451,964.

(51) Int. Cl.
*H04L 29/06* (2006.01)
*H04W 12/37* (2021.01)
(Continued)

(52) U.S. Cl.
CPC .......... *H04W 12/37* (2021.01); *H04L 9/3239* (2013.01); *H04W 12/72* (2021.01); *H04L 9/50* (2022.05)

(58) Field of Classification Search
None
See application file for complete search history.

(56) References Cited

U.S. PATENT DOCUMENTS

| 2012/0282924 A1* | 11/2012 | Tagg | H04W 4/02 |
| | | | 455/432.1 |
| 2014/0004827 A1* | 1/2014 | O'Leary | H04W 12/35 |
| | | | 455/411 |

(Continued)

FOREIGN PATENT DOCUMENTS

| CN | 1058988 A | 8/2016 |
| EP | 2680628 A1 | 1/2014 |
| WO | 2019001717 A1 | 1/2019 |

OTHER PUBLICATIONS

Raju, S. et al., "Identity Management using Blockchain for Cognitive Cellular Networks", IEEE International Conference on Communications (ICC), Paris, Jan. 1, 2017, pp. 1-6, IEEE.

(Continued)

*Primary Examiner* — Cheng-Feng Huang
*Assistant Examiner* — Hassan A Hussein
(74) *Attorney, Agent, or Firm* — COATS & BENNETT, PLLC

(57) ABSTRACT

An operator system of a wireless communication network operator sends, to a regulator system of a regulator, a record that includes information about administration of a subscription identifier associated with the wireless communication network operator. Responsive to sending the record to the regulator system, the operator system receives a response that indicates whether the regulator system approves of or rejects the record being added to a permissioned distributed database that is distributed at least in part between the regulator system and the operator system. The operator system adds or does not add the record to the permissioned distributed database depending on the response.

13 Claims, 14 Drawing Sheets

(51) Int. Cl.
*H04W 12/72* (2021.01)
*H04L 9/32* (2006.01)
*H04L 9/00* (2022.01)

(56) References Cited

U.S. PATENT DOCUMENTS

| | | | |
|---|---|---|---|
| 2014/0094144 A1* | 4/2014 | Thorn | H04W 12/06 |
| | | | 455/411 |
| 2014/0335831 A1* | 11/2014 | Lamberton | H04W 12/126 |
| | | | 455/411 |
| 2017/0141959 A1* | 5/2017 | Gilmore | H04L 67/141 |
| 2018/0101848 A1* | 4/2018 | Castagna | G06F 9/5016 |
| 2018/0103042 A1* | 4/2018 | Castagna | H04L 9/3236 |
| 2019/0026450 A1* | 1/2019 | Egner | G06F 21/44 |
| 2019/0090286 A1* | 3/2019 | Vandikas | H04W 76/10 |
| 2019/0124512 A1* | 4/2019 | Phan | H04W 12/48 |
| 2019/0245917 A1* | 8/2019 | Mendiola | G06Q 50/01 |
| 2020/0311237 A1 | 10/2020 | De Vos et al. | |
| 2020/0374129 A1 | 11/2020 | Dilles et al. | |
| 2021/0136068 A1* | 5/2021 | Smeets | H04L 63/10 |

OTHER PUBLICATIONS

International Mobile Subscriber Identity, "International Mobile Subscriber Identity (IMSI) Assignment and Management Guidelines and Procedures", Version 15.1, Jan. 1, 2018, pp. 1-43, Telcordia Technologies, Inc.

\* cited by examiner

ADMINISTRATION OF SUBSCRIPTION IDENTIFIERS IN A WIRELESS COMMUNICATION NETWORK

RELATED APPLICATIONS

The present application is a divisional of U.S. patent application Ser. No. 17/047,546, which was filed on Oct. 14, 2020, which is a national stage application of PCT/SE2018/050425, which was filed Apr. 25, 2018, the disclosures of each of which are hereby incorporated by reference in their entireties.

TECHNICAL FIELD

The present disclosure generally relates to a wireless communication network, and more particularly relates to subscription identifiers in such a wireless communication network.

BACKGROUND

A wireless communication network provides service to a wireless communication device that the network authenticates as having a subscription to receive service from the network. The operator of the network, the manufacturer of the device, and/or some other party in this regard provisions a tamper-resistant secure hardware component (e.g., an integrated circuit card) with information tied to the subscription and associates the device with the subscription by embedding or removably inserting the component into the device. The device then uses the information from the secure hardware component to register and authenticate with the network.

The information provisioned onto the secure hardware component may include security credentials (e.g., a key K) as well as a subscription identifier that identifies the subscription. The subscription identifier may for instance be all or part of an International Mobile Subscriber Identity (IMSI), a subscriber permanent identifier (SUPI), or any other identifier that identifies the subscription to at least the network operator.

The logistics of assigning subscription identifiers to respective secure hardware components and otherwise administering subscription identifiers proves quite complicated. In fact, many countries impose regulations on network operators to ensure that the identifiers are administered responsibly and efficiently. These regulations and other barriers threaten the flexibility, cost, and speed with which subscription identifiers can be administered, which may in turn limit the scalability and use cases of certain deployments such as those that rely on the internet-of-things (IoT).

SUMMARY

Embodiments herein facilitate administration of subscription identifiers for use in a wireless communication network. Some embodiments do so by exploiting a permissioned distributed database (e.g., a permissioned blockchain) that is distributed at least in part between a wireless communication network operator and a regulator that regulates subscription identifier administration. In one embodiment, for example, the operator records information in the distributed database describing the operator's administration of subscription identifiers, subject to the regulator's verification that the operator complies with rules governing such administration. At least some of the regulator's verification in this regard may be inherently embodied in the distributed database's consensus protocol so as to exploit the consensus protocol for realizing substantially real-time oversight of the operator's administration, e.g., from an individual subscription identifier perspective. Moreover, because the distributed nature of the database efficiently replicates information about the operator's administration at the regulator, some embodiments provide the regulator with on-demand analysis (e.g., auditing) of the operator's administration for compliance with applicable regulations, e.g., from an overall perspective across all subscription identifiers. In still other embodiments herein, the distributed database has a multitier structure that enables the operator to delegate subscriber identifier administration to other parties, e.g., to enterprises. These and other embodiments herein may advantageously improve the flexibility, cost, and speed with which subscription identifiers can be administered, while maintaining regulator oversight of that administration.

More particularly, embodiments herein include a method performed by a regulator system of a regulator for regulating administration of subscription identifiers. The method comprises receiving, by the regulator system from either an operator system of a wireless communication network operator or an enterprise system of an enterprise, a record that includes information about administration of a subscription identifier associated with the wireless communication network operator. The method also comprises verifying by the regulator system whether administration of the subscription identifier as indicated by the record conforms to one or more rules governing administration of subscription identifiers. The method may further comprise, depending on said verifying, the regulator system approving or rejecting the record for addition to a permissioned distributed database that is distributed at least in part between the regulator system and either (or both) the operator system or the enterprise system.

In some embodiments, said verifying comprises verifying one or more of: whether the subscription identifier has been administered with a format that conforms to the one or more rules; whether the subscription identifier has been administered with only one end user or end device in conformance with the one or more rules; whether the subscription identifier is within a set of subscription identifiers that is administrable according to the one or more rules; or whether the subscription identifier has been administered within a time period that conforms to the one or more rules.

Alternatively or additionally, information in the record according to some embodiments indicates one or more of: the subscription identifier; a set of subscription identifiers that includes the subscription identifier; whether or not the subscription identifier is active for administration; whether and/or when the subscription identifier was assigned to an end user or end device; or whether and/or when the subscription identifier was activated for working use.

In some embodiments, the method further comprises analyzing, by the regulator system and based on multiple records included in the permissioned distributed database, whether subscription identifiers associated with the wireless communication network operator have been administered in conformance with one or more rules. In one embodiment, for example, the analyzing comprises determining one or more metrics indicating how many, and/or a rate at which, subscription identifiers assigned to end users or end devices have been activated for working use and evaluating whether the one or more metrics conforms to one or more rules. Alternatively or additionally, in embodiments where subscription identifiers associated with the wireless communication network operator are mobile subscription identification numbers (MSINs) associated with a home network identity (HNI) assigned to the wireless communication network operator, the analyzing may comprise analyzing an extent to which the HNI has been deployed for working use with MSINs and/or whether the HNI has been deployed within a required time frame.

In some embodiments, the permissioned distributed database includes a regulator tier and an operator tier. In this case, the set of one or more regulator-tier records in the regulator tier may include information associated with the wireless communication network operator and be linked to a set of one or more operator-tier records in the operator tier that includes information about administration of subscription identifiers associated with the wireless communication network operator, and the received record may be an operator-tier record received from the operator system.

In still other embodiments, the permissioned distributed database includes a regulator tier, an operator tier, and an enterprise tier. In this case, a set of one or more regulator-tier records in the regulator tier may include information associated with the wireless communication network operator. Moreover, the set of one or more regulator-tier records may be linked to a set of one or more operator-tier records in the operator tier. Further, the set of one or more operator-tier records may include information associated with one or more enterprises to which the wireless communication network operator has delegated administration of respective sets of subscription identifiers. Also, the set of one or more operator-tier records may be linked to a set of one or more enterprise-tier records in the enterprise tier. Still further, the set of one or more enterprise-tier records may include information about administration of subscription identifiers as delegated by the wireless communication network operator to the one or more enterprises. In this case, the received record may be an enterprise-tier record received from the enterprise system of the enterprise to which the wireless communication network operator has delegated administration of the subscription identifier. In one embodiment, each enterprise-tier record includes information that indicates a set of subscription identifiers administered by an enterprise. Alternatively or additionally, the set of one or more operator-tier records includes an enterprise-tier pointer that links the set of one or more operator-tier records to the set of one or more enterprise-tier records.

In some embodiments, the operator tier, but not the regulator tier, is distributed between the regulator system and the operator system. Alternatively or additionally, the regulator system in some embodiments has exclusive control over which records are added to the operator tier of the permissioned distributed database.

In some embodiments, the set of one or more regulator-tier records includes one or more of: information indicating a home network identity (HNI) assigned to the wireless communication network operator; information indicating whether or not subscription identifiers associated with the wireless communication network operator are administrable; information associated with a contract between the regulator and the wireless communication network operator; contact information for the wireless communication network operator; information indicating one or more sets of subscription identifiers that the wireless communication network operator is permitted to administer; or information indicating one or more frequency spectrum ranges in which the wireless communication network operator is permitted to operate.

In some embodiments, the set of one or more regulator-tier records includes an operator-tier pointer that links the set of one or more regulator-tier records to the set of one or more operator-tier records for the wireless communication network operator.

In any of these embodiments, subscription identifiers associated with the wireless communication network operator may be mobile subscription identification numbers (MSINs) associated with a home network identity (HNI) assigned to the wireless communication network operator.

Also in any of these embodiments, the permissioned distributed database may be a permissioned blockchain.

Embodiments herein also include a corresponding apparatus, computer program, and carrier (e.g., computer readable medium). For example, embodiments include a regulator system of a regulator for regulating administration of subscription identifiers. The regulator system is configured to receive, from either an operator system of a wireless communication network operator or an enterprise system of an enterprise, a record that includes information about administration of a subscription identifier associated with the wireless communication network operator. The regulator system is also configured to verify whether administration of the subscription identifier as indicated by the record conforms to one or more rules governing administration of subscription identifiers. The regulator system is further configured to, depending on said verifying, approve or reject the record for addition to a permissioned distributed database that is distributed at least in part between the regulator system and either (or both) the operator system or the enterprise system.

Embodiments also include a method performed by an operator system of a wireless communication network operator. The method comprises sending to a regulator system of a regulator a record that includes information about administration of a subscription identifier associated with the wireless communication network operator. The method further comprises, responsive to sending the record to the regulator system, receiving a response that indicates whether the regulator system approves or rejects of the record being added to a permissioned distributed database that is distributed at least in part between the regulator system and the operator system. The method also comprises adding or not adding the record to the permissioned distributed database depending on the response.

In some embodiments, information in the record indicates one or more of: the subscription identifier; a set of subscription identifiers that includes the subscription identifier; whether or not the subscription identifier is active for administration; whether and/or when the subscription identifier was assigned to an end user or end device; or whether and/or when the subscription identifier was activated for working use.

In some embodiments, the permissioned distributed database includes a regulator tier and an operator tier. In this case, the set of one or more regulator-tier records in the regulator tier in some embodiments includes information associated with the wireless communication network operator and is linked to a set of one or more operator-tier records in the operator tier that includes information about administration of subscription identifiers associated with the wireless communication network operator. Also, the sent record in some embodiments is an operator-tier record.

In still other embodiments, the method further comprises receiving, by the operator system from an enterprise system of an enterprise to which the wireless communication network operator has delegated administration of a subscription identifier, a record that includes information about administration of the subscription identifier by the enterprise. In this case, the method may further comprise verifying by the operator system whether administration of the subscription identifier as indicated by the received record conforms to one or more rules governing administration of subscription identifiers. The method may also comprise, depending on said verifying, the operator system approving or rejecting the received record for addition to the permissioned distributed database. The permissioned distributed database in this case may also be distributed at least in part between the operator system and the enterprise system.

In some of these embodiments, for example, the permissioned distributed database includes a regulator tier, an operator tier, and an enterprise tier. In this case, a set of one or more regulator-tier records in the regulator tier may include information associated with the wireless communication network operator. Moreover, the set of one or more regulator-tier records may be linked to a set of one or more operator-tier records in the operator tier. Further, the set of one or more operator-tier records may include information associated with one or more enterprises to which the wireless communication network operator has delegated administration of respective sets of subscription identifiers. Also, the set of one or more operator-tier records may be linked to a set of one or more enterprise-tier records in the enterprise tier. Still further, the set of one or more enterprise-tier records may include information about administration of subscription identifiers as delegated by the wireless communication network operator to the one or more enterprises. In this case, the enterprise tier of the permissioned distributed database is distributed between the operator system and the enterprise system. The received record may be an enterprise-tier record. In one embodiment, each enterprise-tier record includes information that indicates a set of subscription identifiers administered by an enterprise. Alternatively or additionally, the set of one or more operator-tier records includes an enterprise-tier pointer that links the set of one or more operator-tier records to the set of one or more enterprise-tier records.

In some embodiments, the operator tier, but not the regulator tier, is distributed between the regulator system and the operator system. Alternatively or additionally, the regulator system in some embodiments has exclusive control over which records are added to the operator tier of the permissioned distributed database.

In any of these embodiments, subscription identifiers associated with the wireless communication network operator may be mobile subscription identification numbers (MSINs) associated with a home network identity (HNI) assigned to the wireless communication network operator.

Also in any of these embodiments, the permissioned distributed database may be a permissioned blockchain.

Embodiments herein also include a corresponding apparatus, computer program, and carrier (e.g., computer readable medium). For example, embodiments include an operator system configured for use by a wireless communication network operator. The operator system is configured to send to a regulator system of a regulator a record that includes information about administration of a subscription identifier associated with the wireless communication network operator. The operator system is also configured to, responsive to sending the record to the regulator system, receive a response that indicates whether the regulator system approves or rejects of the record being added to a permissioned distributed database that is distributed at least in part between the regulator system and the operator system. The operator system may also be configured to add or not add the record to the permissioned distributed database depending on the response.

Embodiments further include a method performed by an enterprise system of an enterprise to which a wireless communication system operator delegates administration of a subscription identifier. The method comprises sending, to an operator system of the wireless communication network operator and/or to a regulator system of a regulator, a record that includes information about administration of a subscription identifier by the enterprise system. The method also comprises, responsive to sending the record, receiving one or more responses that indicate whether the operator system and/or the regulator system approves or rejects of the record being added to a permissioned distributed database that is distributed at least in part between the enterprise system, the operator system, and the regulator system. The method may also comprise adding or not adding the record to the permissioned distributed database depending on the one or more responses. In one embodiment, for example, the method comprises sending the record to both the operator system and the regulator system, and adding or not adding the record to the permissioned distributed database depending respectively on whether or not both the operator system and the regulator system approve of the record being added.

In some embodiments, information in the record indicates one or more of: the subscription identifier; a set of subscription identifiers that includes the subscription identifier; whether or not the subscription identifier is active for administration; whether and/or when the subscription identifier was assigned to an end user or end device; or whether and/or when the subscription identifier was activated for working use.

In some embodiments, the permissioned distributed database includes a regulator tier, an operator tier, and an enterprise tier. In this case, a set of one or more regulator-tier records in the regulator tier may include information associated with the wireless communication network operator. Moreover, the set of one or more regulator-tier records may be linked to a set of one or more operator-tier records in the operator tier. Further, the set of one or more operator-tier records may include information associated with the enterprise to which the wireless communication network operator has delegated administration of a set of subscription identifiers. Also, the set of one or more operator-tier records may be linked to a set of one or more enterprise-tier records in the enterprise tier. Still further, the set of one or more enterprise-tier records may include information about administration of subscription identifiers as delegated by the wireless communication network operator to the enterprise. In this case, the sent record may be an enterprise-tier record.

In one embodiment, the set of one or more operator-tier records includes an enterprise-tier pointer that links the set of one or more operator-tier records to the set of one or more enterprise-tier records. Alternatively or additionally, the enterprise tier, but not the regulator tier or the operator tier, is distributed between the enterprise system, the operator system, and the regulator system.

In any of these embodiments, the subscription identifier may be a mobile subscription identification number (MSIN) associated with a home network identity (HNI) assigned to the wireless communication network operator.

Also in any of these embodiments, the permissioned distributed database may be a permissioned blockchain.

Embodiments herein also include a corresponding apparatus, computer program, and carrier (e.g., computer readable medium). For example, embodiments include an enterprise system of an enterprise to which a wireless communication system operator delegates administration of a subscription identifier. The enterprise system is configured to send, to the operator system and/or to a regulator system of a regulator, a record that includes information about administration of a subscription identifier by the enterprise system. The enterprise system is also configured to, responsive to sending the record, receive one or more responses that indicate whether the operator system and/or the regulator system approves or rejects of the record being added to a permissioned distributed database that is distributed at least in part between the enterprise system, the operator system, and the regulator system. The enterprise system is further configured to add or not add the record to the permissioned distributed database depending on the one or more responses.

DETAILED DESCRIPTION

Figure 1:
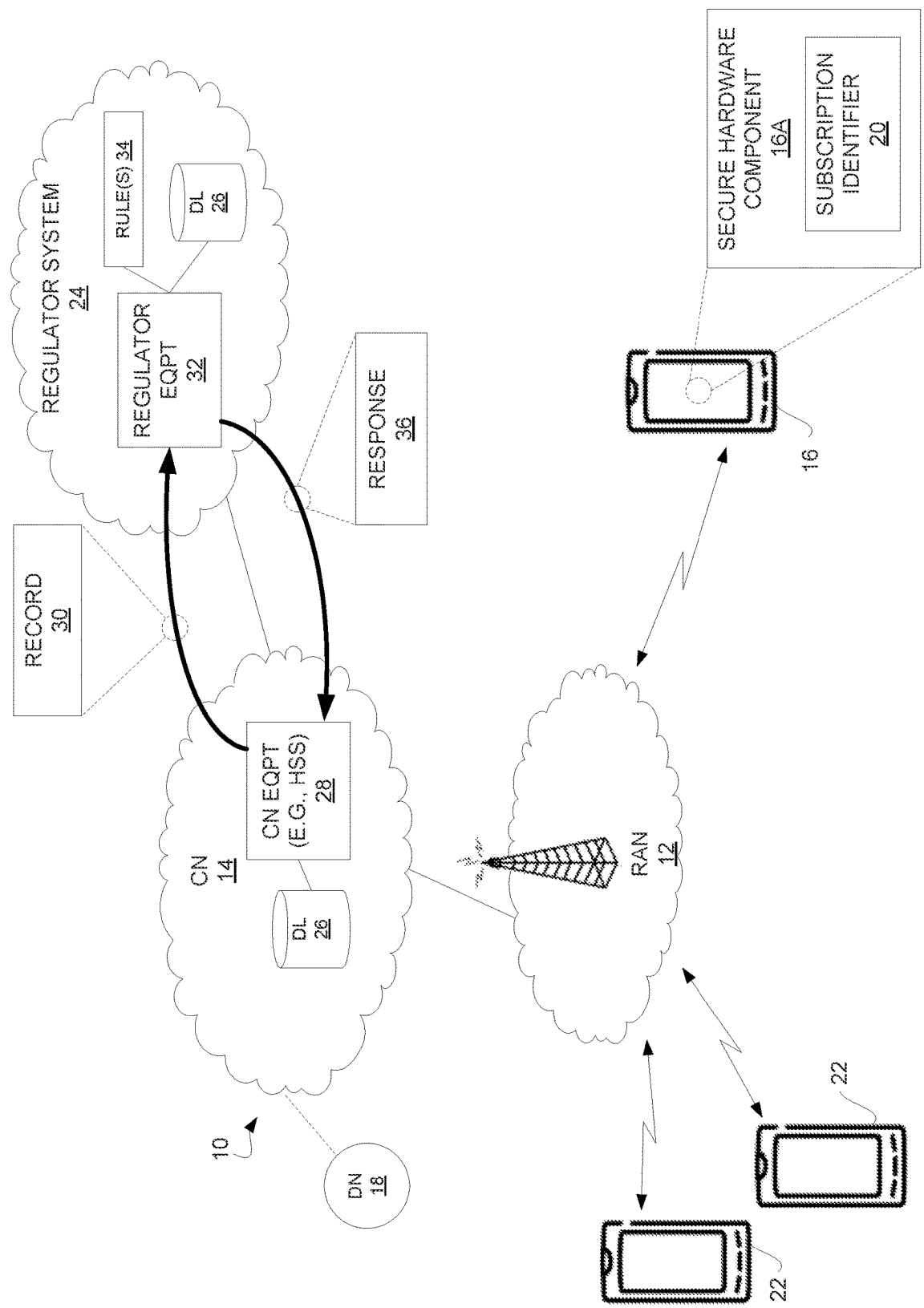
FIG. 1 is a block diagram of an operator system and a regulator system according to one or more embodiments.

FIG. 1 shows an operator system 10 of a wireless communication network operator according to one or more embodiments. As shown in FIG. 1, the operator system 10 includes a radio access network (RAN) 12 and a core network (CN) 14. The RAN 12 in configured to wirelessly connect a wireless communication device 16 to the CN 14. The CN 14 is in turn configured to connect the wireless communication device 16 to one or more external networks, such as a data network (DN) 18 (e.g., the Internet).

The operator system 10 provides service in this way to a wireless communication device 16 that the operator system 10 authenticates as having a subscription to receive service from the operator system 10. To this end, a wireless communication device 16 uses information provisioned on a tamper-resistant secure hardware component 16A in order to authenticate itself to the operator system 10 as having a subscription to receive service. The secure hardware component 16A may be for instance an integrated circuit card (ICC) that is embedded or removably inserted in the device 16, e.g., in the form of a universal ICC, an IP Multimedia Services ICC, an embedded ICC, a firmware or software-based integrated ICC (also known as iUICC) or the like. Regardless of the particular form of the secure hardware component 16A, the information provisioned on the component 16A includes a subscription identifier 20 that identifies a subscription to receive service from the operator system 10. The subscription identifier 20 may for instance be all or part of an International Mobile Subscriber Identity (IMSI), a subscriber permanent identifier (SUPI), or any other identifier that identifies the subscription to at least the operator system 10. The device 16 uses this and possibly other information (e.g., security credentials) provisioned on the secure hardware component 16A in procedures to register and authenticate with the operator system 10. The subscription identifier 20 may also be used for other purposes, such as by the operator system 10 for subscriber billing purposes.

Other wireless communication devices 22 may similarly authenticate themselves as having respective subscriptions to receive service from the operator system 10. Each of the devices 22 in this regard may authenticate with the operator system 10 using subscription-specific information provisioned on other respective tamper-resistant secure hardware components (not shown). The information may include for instance subscription identifiers that identify different respective subscriptions.

Logistically, then, different subscription identifiers must be associated with and must identify different respective subscriptions. Different subscription identifiers must also be uniquely assigned to different respective secure hardware components, e.g., the same subscription identifier cannot be assigned to multiple secure hardware components. Moreover, in practice, some subscription identifiers may be allocated for working use (e.g., by paying subscribers), whereas other subscription identifiers may be allocated for testing use, reserved for future use, suspended from use (e.g., due to theft), etc. Administration of subscription identifiers as used herein thereby involves, for example, generating subscription identifiers, associating subscription identifiers with respective subscriptions, assigning subscription identifiers to respective secure hardware components, allocating subscriptions identifiers for certain uses (e.g., working use or testing use), and/or updating the status of subscription identifiers (e.g., activated for working use, deactivated from working use, suspended from use, etc.).

FIG. 1 also shows a regulator system 24 of a regulator that regulates administration of subscription identifiers, in the sense that the regulator ensures subscription identifiers are administered in compliance with rules that govern such administration. The regulator may for example make decisions regarding whether subscription identifiers are administered in compliance with the rules and execute the consequences of those decisions.

For example, in some embodiments where a subscription identifier is all or part of an IMSI, IMSIs are considered finite, public resources that enable wireless communication devices to roam among public networks, domestically and internationally. An IMSI in this regard is formed from a home network identity (HNI) that identifies a wireless communication network that is the home network of a subscription and from a mobile station identification number (MSIN) that identifies the subscription in the home network. Rules dictate that IMSIs be unique and be formatted uniformly so that the IMSIs will be recognizable by all conforming public networks. Rules also dictate that the IMSIs be used efficiently and effectively, in order to ensure that IMSI inventory remains adequate and available for the public. A regulator may decide whether a wireless communication network operator administers IMSIs in compliance with these rules. If the regulator decides that the operator has not complied with the rules, the regulator may reclaim IMSIs that were made available to the operator, so that they will be available for other operators.

Different rules and/or regulators may be established for different countries or jurisdictions. For the United States, the regulator that ensures IMSIs are administered in compliance with the rules may be referred to as an IMSI-Administrator (IMSI-A), under the oversight of the IMSI Oversight Council (IOC). The IMSI-A participates in the management of all parts of an IMSI, including the home network identity (HNI) part as well as the mobile station identification number (MSIN) part. But the IMSI-A directly administers only the HNI part, by assigning HNIs to respective network operators. Each wireless communication network operator directly administers the MSIN part of an IMSI. In some embodiments, then, subscription identifiers administered by an operator may refer to MSINs associated with the HNI to which the operator has been assigned.

In any event, although regulation of subscription identifier administration in some embodiments ensures the widespread functionality and availability of subscription identifiers, the regulation threatens the flexibility, cost, and speed with which subscription identifiers can be administered. This may in turn limit the scalability and use cases of certain deployments such as those that rely on the internet-of-things (IoT).

Embodiments herein facilitate administration of subscription identifiers to address these and/or other problems. As shown in FIG. 1, some embodiments do so by exploiting a permissioned distributed database (DL) 26 that is distributed at least in part between the regulator system 24 and the operator system 10 of a wireless communication network operator. A distributed database as used herein is a consensus of replicated, shared, and synchronized data geographically spread across multiple sites (e.g., multiple systems). That is, the data is shared across the multiple sites in order that the data be synchronized and replicated at each of the sites, e.g., according to a consensus protocol. A distributed database as used herein may also be referred to interchangeably as a distributed ledger. In some embodiments, for example, the permissioned distributed database 26 is a permissioned (e.g., federated) blockchain, e.g., where records are appended to the blockchain in blocks, with each block containing a cryptographic hash of the previous block. In these and other embodiments, the permissioned distributed database 26 may be immutable, e.g., in the practical sense that changing the consensus of data would require extreme computational effort and collaboration. Regardless of the particular form of the distributed database 26, the distributed database 26 is permissioned in the sense that the protocol for forming the consensus is controlled by select participant(s) that have permission to do so, e.g., based on a proof-of-stake protocol.

Some embodiments exploit this permissioned distributed database 26 in such a way that the operator system 10 records information in the distributed database 26 describing the operator's administration of subscription identifiers, subject to the regulator system's verification that the operator system 10 complies with rules governing such administration. At least some of the regulator system's verification in this regard may be inherently embodied in the distributed database's consensus protocol, e.g., so as to exploit the consensus protocol for realizing substantially real-time oversight of the operator system's administration. These and other embodiments herein may advantageously improve the flexibility, cost, and speed with which subscription identifiers can be administered, while maintaining regulator oversight of that administration.

As shown in FIG. 1, for example, the operator system 10 includes core network (CN) equipment 28, e.g., in the form of a home subscriber server (HSS) or Home Location Register (HLR). The CN equipment 28 is configured to send a record 30 to regulator equipment 32 in the regulator system 24. The record 30 includes information about administration of a subscription identifier associated with the wireless communication network operator. The information in the record 30 may indicate, for instance, the subscription identifier itself, a set (e.g., range) of subscription identifiers that includes the subscription identifier, whether and/or when the subscription identifier was assigned to an end user or end device, and/or whether and/or when the subscription identifier was activated for working use, deactivated from working use, suspended from use, etc. The information in the record 30 in some embodiments also includes a timestamp of when the record 30 was created by the operator system 10.

The regulator system 24 receives the record 30 and verifies whether administration of the subscription identifier as indicated by the record 30 conforms to one or more rules 34 governing administration of subscription identifiers. Such verification may involve verifying, for example, whether the subscription identifier has been administered in a format that conforms to the one or more rules 34. The one or more rules 34 may for instance specify the format in terms of an allowable length of the subscription identifier, an allowable set of characters or digits of the subscription identifier, allowable locations of certain characters or digits, or the like. In embodiments where the subscription identifier is an MSIN, for instance, the one or more rules 34 may require that the subscription identifier be in the format XXXXXXXXX, where X equals any of the decimal digits 0-9.

The regulator system 24 may also or alternatively verify whether the subscription identifier has been administered within a time period that conforms to the one or more rules 34. The one or more rules 34 may for instance specify a range of subscription identifiers and/or a number of subscription identifiers permitted to be assigned by the operator system 10 during a certain time period, e.g., 10,000 subscription identifiers per year.

Alternatively or additionally, the regulator system 24 verifies whether the subscription identifier has been administered with only one end user or end device in conformance with the one or more rules 34. For example, the one or more rules 34 may specify that any given subscription identifier may be associated with only one subscription, e.g., by being assigned to only one tamper-resistant secure hardware component. This may prevent the same subscription identifier from being assigned multiple times.

As another example, the regulator system 24 in some embodiments verifies whether the subscription identifier is within a set (e.g., a range) of subscription identifiers that is administrable by the operator system 10 according to the one or more rules 34. In one embodiment, for instance, the one or more rules 34 specify that the operator system 10 is only permitted to assign subscription identifiers included in a certain set, e.g., with subscription identifiers outside of the set being reserved for other wireless communication network operators.

In these and other embodiments, then, the regulator system 24 may verify whether the operator system 10 has administered a subscription identifier in conformance with the one or more rules 34. This verification may be performed from an individual subscription identifier perspective, e.g., to verify whether one particular subscription identifier was administered appropriately. In some embodiments, though, the same record 30 may include information about administration of a set (e.g., range) of subscription identifiers associated with the operator, e.g., to avoid a large number of records for every subscription. For example, the information in the record 30 may indicate the set of subscription identifiers, and, for each subscription identifier in the set, whether and/or when the subscription identifier was assigned to an end user or end device, whether and/or when the subscription identifier was activated for working use, deactivated from working use, suspended from use, etc. as described above with respect to an individual subscription identifier. In this case where the record 30 includes information about administration of a set of subscription identifiers, the regulator system 24 verifies whether the operator system 10 has administered each subscription identifier in the set in conformance with the one or more rules 34, e.g., such that verification is performed from an individual record perspective. For example, the regulator system 24 may verify whether each subscription identifier in the set has been administered in a format that conforms to the one or more rules, e.g., in terms of an allowable length, an allowable set of characters or digits, or the like.

No matter the particular nature of the verification, the regulator system 24 approves or rejects the record 30 for addition to the permissioned distributed database 26 depending on the verification. In particular, if the regulator system 24 verifies that administration of the subscription identifier(s) as indicated by the record 30 does conform to the one or more rules 34, the regulator system 24 approves the record 30 for addition to the permissioned distributed database 26. But if the regulator system 24 verifies that administration of the subscription identifier(s) as indicated by the record 30 does not conform to the one or more rules 34, the regulator system 24 rejects the record 30 for addition to the permissioned distributed database 26. The regulator system 24 accordingly sends a response 36 to the operator system 10 indicating whether the regulator system 24 approves of or rejects the record 30 being added to the permissioned distributed database 26. The operator system 10 correspondingly adds or does not add the record 30 to the permissioned distributed database 26 depending on the response 36. In some embodiments, the operator system 10 may perform one or more remedial actions if the regulator system 24 rejects the record 30, such as correcting subscription identifier formatting or otherwise resolving reasons for the rejection, e.g., as signaled to the operator system 10.

With the regulator system's verification dictating or otherwise controlling which records are added to the permissioned distributed database 26, the regulator system 24 in this way controls the consensus represented by the distributed database 26. In some embodiments, then, the regulator system's verification is inherently embodied in the distributed database's consensus protocol so as to exploit the consensus protocol for realizing substantially real-time oversight of the operator system's administration. This may improve the cost and speed with which subscription identifiers can be administered, without sacrificing regulator oversight. With reduced cost and increased speed, some embodiments allow subscription identifiers to be quickly assigned to many devices with short notice, e.g., in an IoT context involving a large number of devices.

Moreover, because the distributed nature of the database 26 inherently replicates information about the operator system's administration at the regulator system 24, some embodiments provide the regulator with the ability to perform on-demand analysis (e.g., auditing) of the operator's administration for compliance with applicable regulations, e.g., from an overall perspective across all subscription identifiers. This similarly reduces the cost and increases the speed with which subscription identifiers can be administered in compliance with applicable regulations.

More particularly, the regulator system 24 according to some embodiments analyzes, based on multiple records included in the permissioned distributed database 26, whether subscription identifiers associated with the wireless communication network operator have been administered in conformance with one or more rules 34. The analysis may be performed periodically, e.g., with respect to a randomly selected wireless communication network operator. Regardless, the analysis in some embodiments may include determining one or more metrics indicating how many, and/or a rate at which, subscription identifiers assigned to end users or end devices have been activated for working use and evaluating whether the one or more metrics conforms to one or more rules 34. The one or more rules 34 may require for instance that a certain number of subscription identifiers assigned to end users or end devices must have been activated for working use, e.g., so as to effectively require a certain minimum ratio of activated identifiers to assigned identifiers. Alternatively or additionally, the one or more rules 34 may require that subscription identifiers be activated for working use at a certain minimum rate (e.g., 10,000 per year) and/or within a certain time frame (e.g., within 5 years). In these and other embodiments, then, the one or more rules 34 may define quantitative requirements on the operator's subscription identifier administration in order to ensure that the operator efficiently and effectively use subscription identifiers made available to the operator.

As a concrete example in the context of embodiments where the subscription identifiers are MSINs associated with a HNI assigned to the operator, the regulator system 24 may effectively analyze an extent to which the HNI has been deployed for working use with MSINs and/or whether the HNI has been deployed (with working MSINs) within a required time frame. If the regulator system 24 determines that the HNI has not been deployed in accordance with the one or more rules 34, the regulator system 24 may take one or more actions towards reclaiming the HNI from the operator, such as by automatically reclaiming the HNI or by displaying the operator's non-compliance to personnel authorized to reclaim the HNI.

Figure 2:
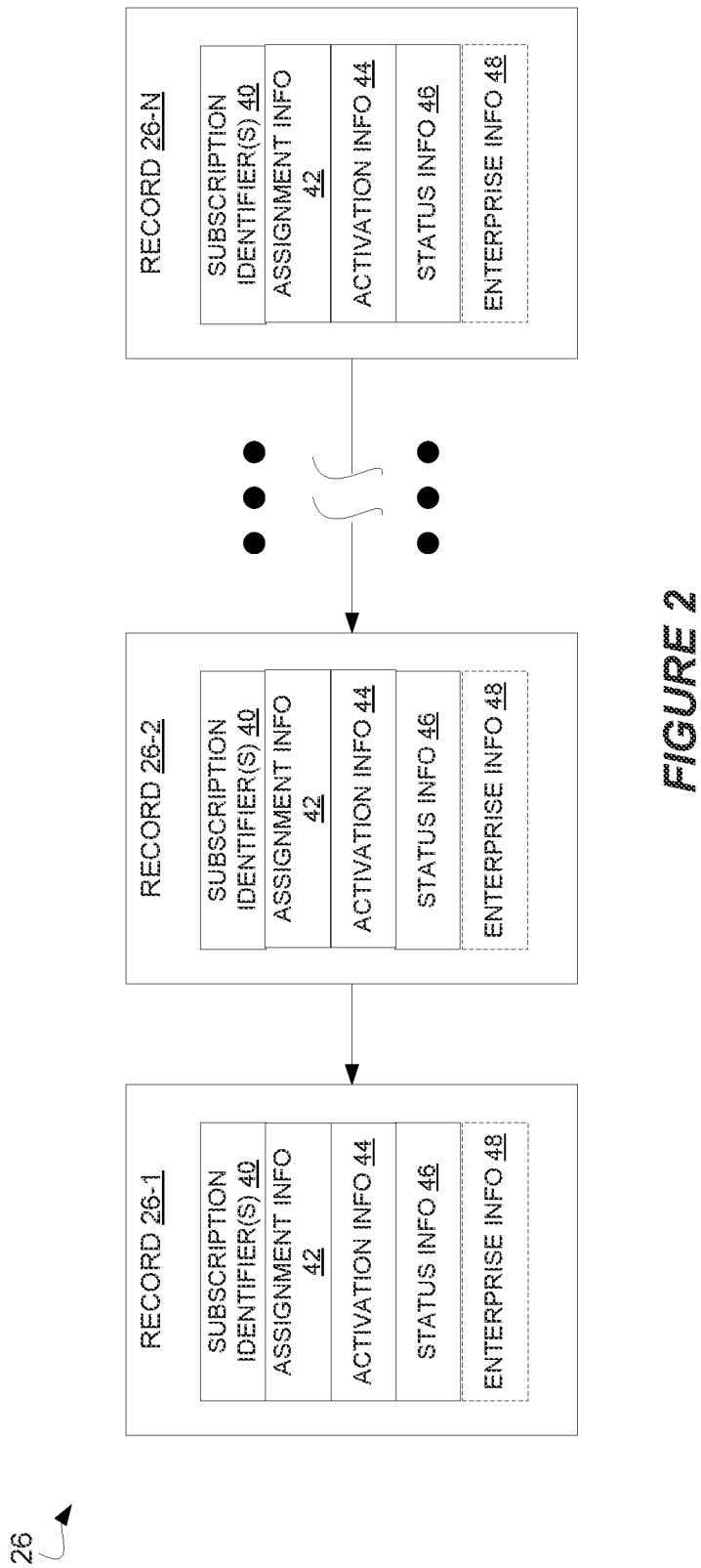
FIG. 2 is a block diagram of records of a permissioned distributed database according to some embodiments.

FIG. 2 shows additional details of the structure of the permissioned distributed database 26 according to some embodiments in which the distributed database 26 is a blockchain. As shown, the database 26 includes a chain of N records 26-1, 26-2, . . . 26-N in the form of blocks. Each block is linked to the previous block in the chain, with each block containing a cryptographic hash of the previous block.

The information in each record (i.e., block) may include one or more subscription identifiers 40, e.g., one or more MSIN values. The information may also include assignment information 42 for those identifier(s) 40. The assignment information 42 may provide verification of assignment for each of the subscription identifier(s) 40 that are assigned for working use. The assignment information 42 in this regard may indicate the date of assignment of each subscription identifier 40 that is working and/or an indication of subscription identifier assignment to end users. In one embodiment, for instance, the assignment information 42 indicates to which end user or end device (e.g., secure hardware component) each working subscription identifier 40 is assigned.

Alternatively or additionally, the information in each record may include activation information 44 for each of the subscription identifier(s) 40 that are assigned for working use and are activated. The activation information 44 may include for instance the activation date of each working subscription identifier 40.

In still other embodiments shown in FIG. 2, the information in each record may include status information 46. The status information 46 may include the status and possibly the status date of each of the subscription identifier(s) 40 that is unavailable for assignment for working use. The status of subscription identifier(s) 40 in some embodiments indicates whether each subscription identifier is assigned for testing, reserved, aging, pending, and/or suspended.

The regulator system 24 may use this and/or other information in each record for verifying each record for addition to the distributed database 26 and/or for analyzing (e.g., auditing) the operator's administration of subscription identifiers for compliance with the one or more rules 34. These records 26-1, 26-2, . . . 26-N may be replicated and synchronized at the operator system 10 and the regulator system 24, so as to represent a consensus of data describing the operator's subscription identifier administration.

Figure 3:
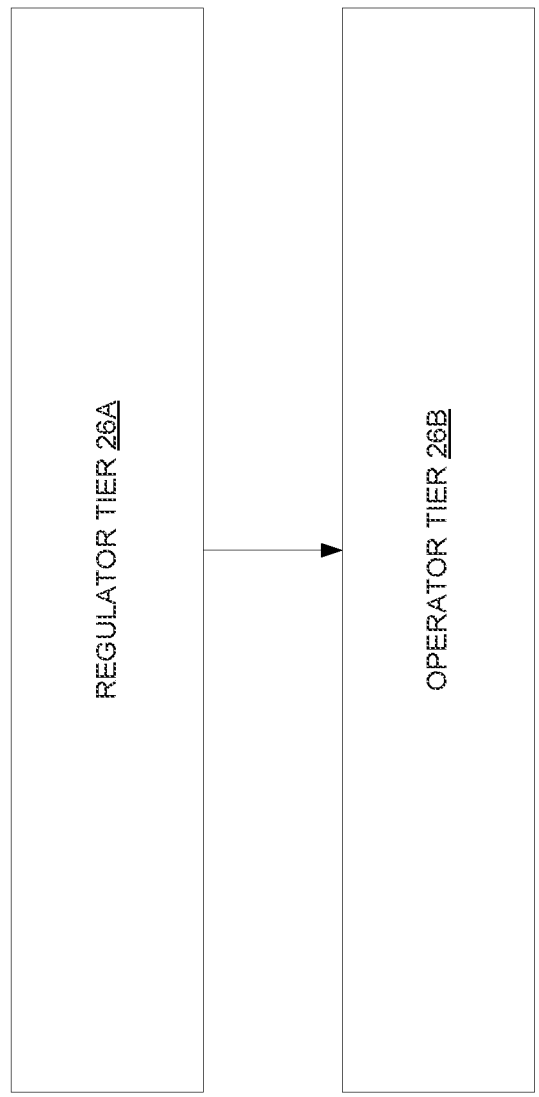
FIG. 3 is a block diagram of a permissioned distributed database with a multi-tier structure according to some embodiments.

In some embodiments as shown in FIG. 3, though, the distributed database 26 has a multi-tier (i.e., multi-dimensional) structure with multiple tiers that include a regulator tier 26A and an operator tier 26B. In this case, the records 26-1, 26-2, . . . 26-N shown in FIG. 2 may be just the records in the operator tier 26B that describe the operator's subscription identifier administration. Record(s) in the regulator tier 26A may contain other information about the operator, e.g., that applies generally to the operator across all of the subscription identifiers administered by the operator. For example, record(s) in the regulator tier 26A may indicate the HNI assigned to the operator, whereas record(s) in the operator tier 26B may include information about the operator's administration of subscription identifiers in the form of MSINs.

Figure 4:
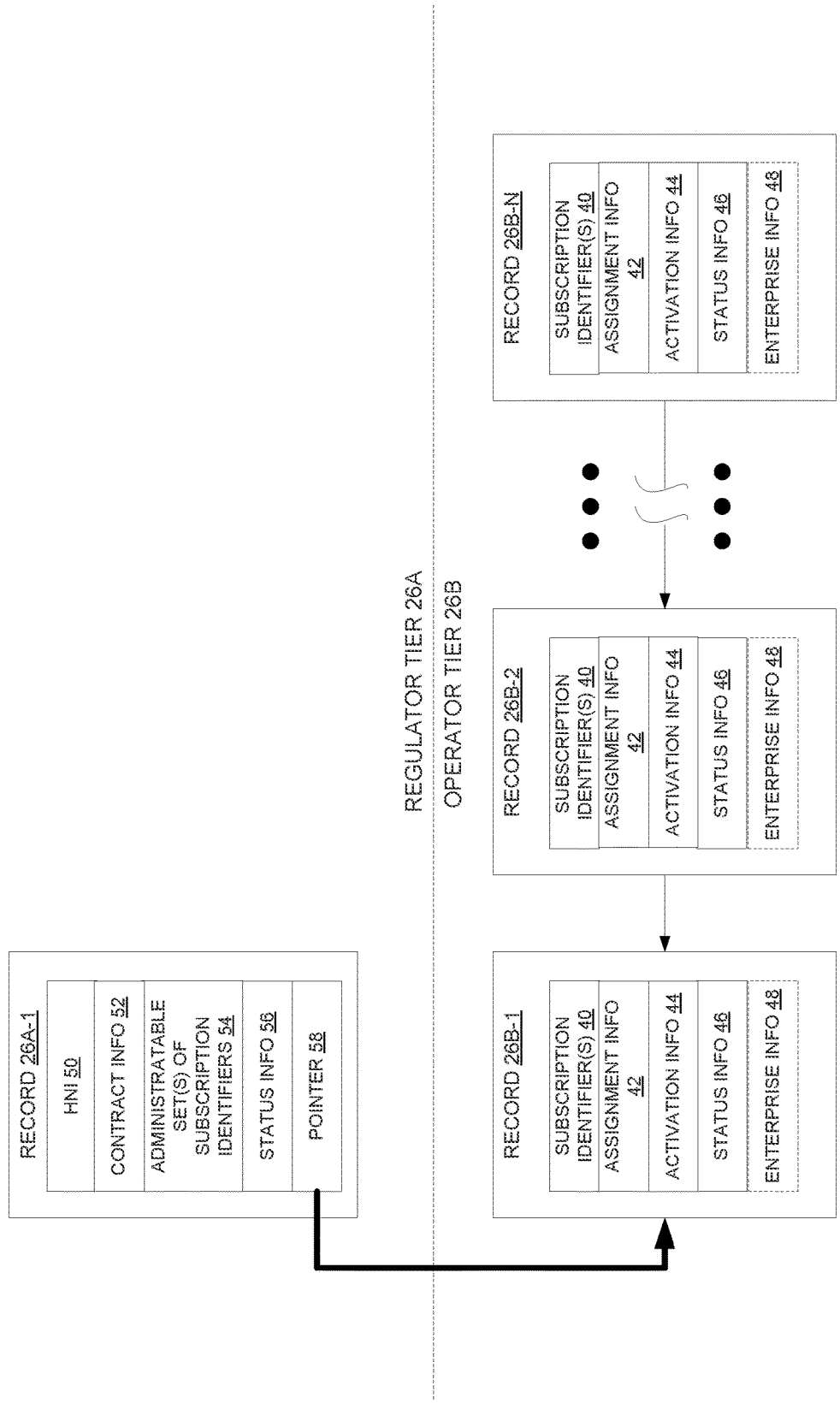
FIG. 4 is a block diagram of records of a permissioned distributed database with a multi-tier structure, including a regulator tier and an operator tier, according to some embodiments.

FIG. 4 illustrates additional details of records in each tier according to some embodiments. As shown, the operator tier 26B includes a set of one or more operator-tier records 26B-1, 26B-2, . . . 26B-N that correspond to the records 26-1, 26-2, . . . 26-N shown in FIG. 2 for indicating information about the operator's subscription identifier administration. In addition, a regulator-tier record 26A-1 in the regulator tier 26A includes information associated with the wireless communication network operator. This record 26A-1 may be created for instance upon onboarding the operator. Additional record(s) (not shown) may be appended to this record 26A-1 in the regulator tier 26A (e.g., after onboarding) to effectively update and/or overwrite conflicting information in records appended previously in time, while still preserving the previously appended records for historical reference and auditing purposes. The regulator tier 26A may therefore include a set of one or more regulator-tier records with information associated with the wireless communication network operator.

The information in the set of one or more regulator-tier records may include information 50 indicating an HNI assigned to the operator. The record(s) may alternatively or additionally include information 52 associated with a contract between the regulator and the operator. The information 52 may for instance indicates a name of the operator, a type of the operator (e.g., a public network operator, a provider of a service profile management system, etc.), radio interface protocol(s) used by the operator, evidence of operator authorization (e.g., a wireless license number and/or a date on which a wireless license was issued to the operator), whether the operator is allocated multiple mobile network codes (MNCs), contact information for the operator (e.g., a contact name, title, physical address, phone number, and/or email address), and/or frequency spectrum range(s) in which the operator is permitted to operate.

The information in the regulator-tier records may alternatively or additionally include information 54 indicating one or more sets of subscription identifiers (e.g., one or more MSIN ranges) that the operator is permitted to administer. The information 54 may for instance explicitly indicate certain set(s) of subscription identifiers that are administrable, e.g., according to a contract between the regulator and the operator. Alternatively, the information 54 may implicitly indicate such set(s) of subscription identifiers, such as by indicating a number of subscription identifiers that are administrable (e.g., the first 10,000 MSINs associated with the operator's HNI).

The record(s) may alternatively or additionally include information 56 indicating a status of subscription identifiers associated with the operator. For example, the information 56 may indicate whether or not subscription identifiers associated with the operator are administrable. In some embodiments, this status constitutes a global setting that effectively validates or invalidates all of the operator's subscription identifiers or otherwise activates or inactivates the operator. The regulator system 24 may therefore use this information setting to impose consequences on an operator for the operator's failure to comply with the one or more rules 34 and thereby maintain meaningful oversight over the operator's subscription identifier administration.

As shown, the information in the regulator-tier records may also include an operator-tier pointer 58. The pointer 58 links the set of one or more regulator-tier records to the set of one or more operator-tier records 26B-1, 26B-2, . . . 26B-N for the operator. The pointer 58 may for instance point or otherwise link the regulator tier 26A to the first record 26B-1 in the set, with remaining records in the set linked in a chain to the first record 26B-1.

For example, in some embodiments, when the regulator system 24 onboards a new operator, the regulator system 24 creates the first record 26A-1 in the regulator tier 26A and the first record 26B-1 in the operator tier 26B. The regulator system 24 links those records/tiers using the pointer 58 in record 26A-1. The regulator system 24 may provide this pointer 58 to the operator system 10 so that the operator system 10 knows where and how to access the first record 26B-1 in the operator tier 26B, for adding operator-tier records to the operator tier 26B subject to the regulator's system approval as described above. In fact, in some embodiments, the regulator system 24 has exclusive control over which records are added to the operator tier 26B. A later added record in the operator tier 26B may update information in a previously added operator-tier record (e.g., update the status of a subscription identifier indicated by a previously added record) or may convey new information (e.g., for a newly assigned subscription identifier). Information in the regulator tier 26A may be updated by appending additional records 26A-2 . . . 26A-M in the regulator tier 26A, while maintaining the linking to the operator tier 26B via the pointer 58.

In one embodiment, the regulator system 24 may effectively write to or update the records in the regulator tier 26A (e.g., by adding new record(s) that override or otherwise render ineffective previously added records), but the operator system 10 cannot. In fact, in some embodiments, the permissioned distributed database 26 is distributed in the sense that at least one tier of the database 26 is distributed between the regulator system 24 and the operator system 10. In one or more such embodiments, the operator tier 26B but not the regulator tier 26A is distributed between the regulator system 24 and the operator system 10. The operator system 10 may therefore not even have read access to the regulator tier 26A.

In some embodiments, as shown in FIGS. 2 and 4, a record in the operator tier 26B may also include information 48 indicating an enterprise associated with one or more of the subscription identifiers 40 in the record. An enterprise as used herein is a business entity. An enterprise may be for instance an automotive manufacturer or a remote surgery equipment vendor. Regardless, the information 48 may indicate an enterprise associated with one or more of the subscription identifiers 40 in the record by indicating an enterprise identifier, e.g., an alphanumeric identifier. With this information 48 associating subscription identifier(s) 40 with certain enterprises, the distributed database 26 advantageously enables analysis and/or enforcement of subscription identifier administration on an enterprise by enterprise basis. Alternatively or additionally, this information 48 enables the operator system 10 to perform enterprise-based network slicing, enterprise-based billing, enterprise-based subscription management, or the like.

For example, the operator system 10 may revise a set of subscription identifiers (e.g., an MSIN range) assigned to an enterprise, by adding a new record to the operator tier 26B with the revised set of subscription identifiers and the enterprise's identifier. Adding the new record invalidates any old record for the enterprise that specifies a different set of subscription identifiers. Alternatively or additionally, the old record's status information 46 may be changed from "active" to "inactive" for the old set of subscription identifiers. In other embodiments, this change may be performed without adding the new record so as to just invalidate the old set of subscription identifiers, e.g., in the case when an enterprise leaves an operator.

The regulator system 10 can also revise or delete the set of subscription identifiers in some embodiments, by modifying information in the regulator-tier record(s). For example, the regulator system 10 may revise the information 54 indicating the administrable set of subscription identifiers and/or the information 56 indicating a status of the subscription identifiers. These and other embodiments may be useful for instance for lawful interception.

In some embodiments, then, the regulator system 24 may ensure that subscription identifier administration conforms to the one or more rules 34 by verifying and/or analyzing operator-tier record(s) including information about such administration. The record 30 in FIG. 1 in such a case may be an operator-tier record, with the response 36 indicating whether the operator-tier record is approved or rejected for addition to the operator tier 26B.

Figure 5:
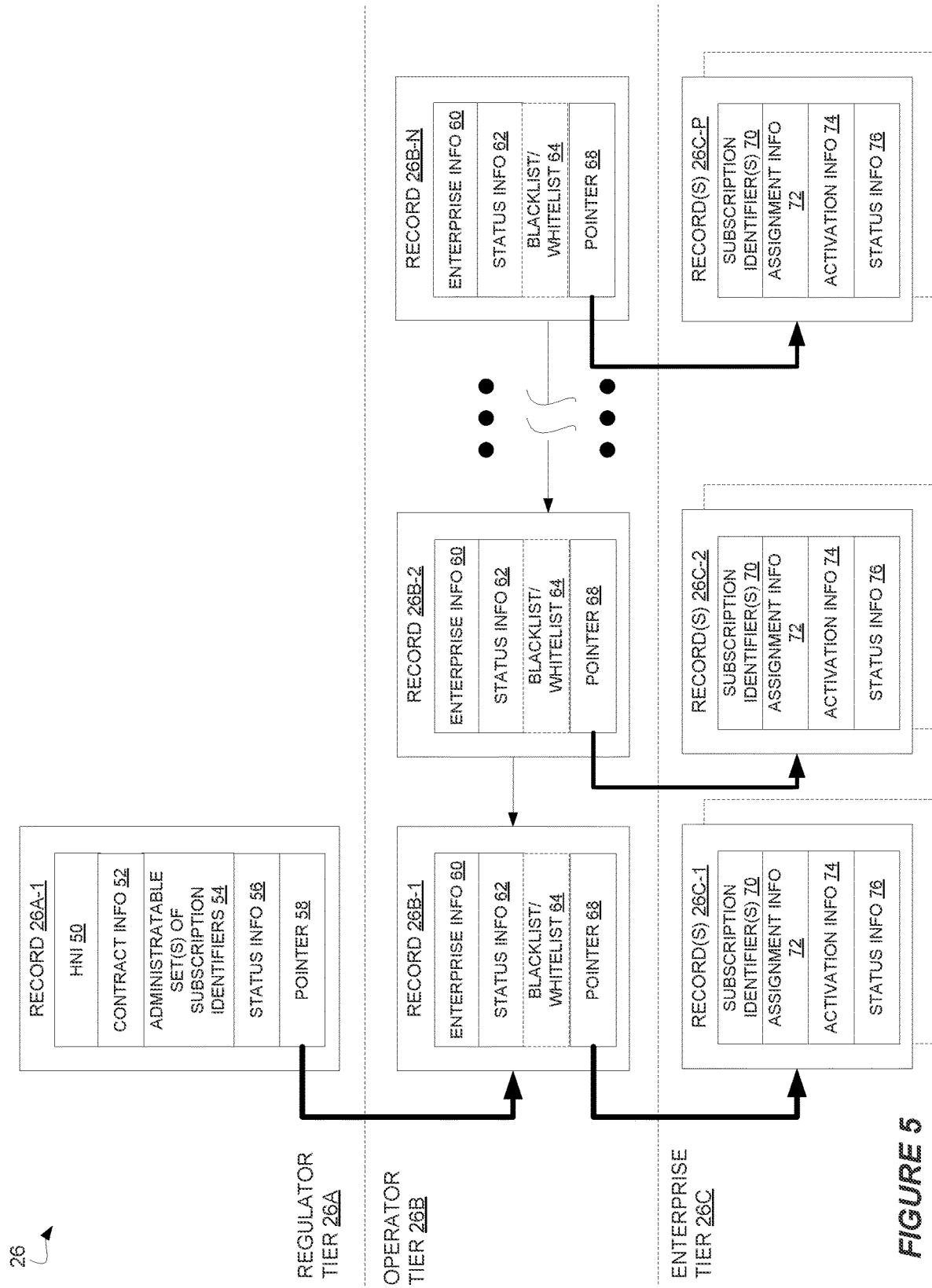
FIG. 5 is a block diagram of records of a permissioned distributed database with a multi-tier structure, including a regulator tier, an operator tier, and an enterprise tier, according to some embodiments.

In still other embodiments herein, the distributed database 26 not only has a regulator tier 26A and an operator tier 26B but also has an enterprise tier 26C. FIG. 5 shows an example of the information included in the distributed database's records according to some of these embodiments.

As shown in FIG. 5, the regulator tier 26A includes a set of one or more regulator-tier records, one of which is shown as record 26A-1, similar to that already described with respect to FIG. 4. That is, the set of regulator-tier record(s) includes information associated with the wireless communication network operator. This set of regulator-tier record(s) is linked (e.g., via operator-tier pointer(s) 58 in the regulator-tier record(s)) to a set of one or more operator-tier records 26B-1, 26B-2, . . . 26B-N. The set of operator-tier record(s) includes information associated with one or more enterprises, e.g., to which the operator provides service. Different operator-tier records may for instance include information associated with different enterprises.

More particularly, the information in an operator-tier record includes enterprise information 60 that indicates a certain enterprise, e.g., using an enterprise identifier. Information in an operator-tier record may also include status information 62 that indicates a status of subscription identifiers associated with the enterprise identified by the enterprise information 60. For example, the status information 62 may indicate whether or not subscription identifiers associated with the enterprise are administrable. In some embodiments, this status constitutes a global setting that effectively validates or invalidates all of the enterprise's subscription identifiers or otherwise activates or inactivates the enterprise. In some embodiments, though, more fine-grained control over certain ones of the enterprise's subscription identifiers may be maintained through the use of a blacklist and/or whitelist 64 included in an operator-tier record, e.g., so as to selectively validate or invalidate certain subscription identifiers. An operator-tier record in these embodiments may therefore contain enterprise-specific information.

Regardless, an operator-tier record in these embodiments may not itself contain information describing administration of subscription identifiers. Instead, the operator-tier record may be linked (e.g., via an enterprise-tier pointer 68) to a set of one or more enterprise-tier records. FIG. 5 for example shows that an operator-tier record 26B-1 associated with a certain enterprise is linked to a set of one or more enterprise-tier records 26C-1. It is the set of one or more enterprise-tier records 26C-1 that includes information about administration of subscription identifiers associated with the certain enterprise. As shown, for instance, the enterprise-tier record(s) 26C-1 each include information 70 that indicates a set of subscription identifier(s) (e.g., MSINs) associated with the certain enterprise. The enterprise-tier record(s) 26C-1 may also include assignment information 72 that provides verification of assignment for each of the subscription identifier(s) 70 that are assigned for working use (e.g., by providing an indication of the assignment date and/or an indication of subscription identifier(s) assigned to end user(s)). The enterprise-tier record(s) 26C-1 may alternatively or additionally include activation information 74 for each of the subscription identifier(s) that are assigned for working use and are activated (e.g., by indicating activation date). The enterprise-tier record(s) 26C-1 as shown may alternatively or additionally include status information 76. The status information 76 may include the status and possibly the status date of each of the subscription identifier(s) 70 that is unavailable for assignment for working use. The status of subscription identifier(s) 70 in some embodiments indicates whether each subscription identifier is assigned for testing, reserved, aging, pending, and/or suspended.

The enterprise tier 26C may similarly include one or more other sets of enterprise-tier records associated with one or more other enterprises, e.g., to which the wireless communication network operator provides service. FIG. 5 in this regard shows that the operator-tier 26B includes another operator-tier record 26B-2 that is associated with a possibly different enterprise and that is linked to a set of one or more enterprise-tier records 26C-2. And the operator-tier 26B includes yet another operator-tier record 26B-N that is associated with a possibly different enterprise and that is linked to a set of one or more enterprise-tier records 26C-P, and so on.

In these and other embodiments, then, the regulator system 24 may ensure that subscription identifier administration conforms to the one or more rules 34 by verifying and/or analyzing enterprise-tier record(s) including information about such administration. The record 30 in FIG. 1 in such a case may be an enterprise-tier record, with the response 36 indicating whether the enterprise-tier record is approved or rejected for addition to the enterprise tier 26C.

Irrespective of the particular information in the records, some embodiments exploit the multi-tier structure of the distributed database 26 to advantageously enable the operator to fully or partially delegate subscriber identifier administration to enterprises. In one or more embodiments, for example, it is the enterprise that records information in the distributed database 26 describing the enterprise's subscription identifier administration (as delegated by the operator), subject to the operator system's and/or the regulator system's verification that the enterprise complies with rules governing such administration. These embodiments thereby exploit a permissioned distributed database that is distributed at least in part (e.g., at the enterprise-tier level) between an enterprise system of the enterprise, the operator system 10 of the operator, and the regulator system 24.

Figure 6:
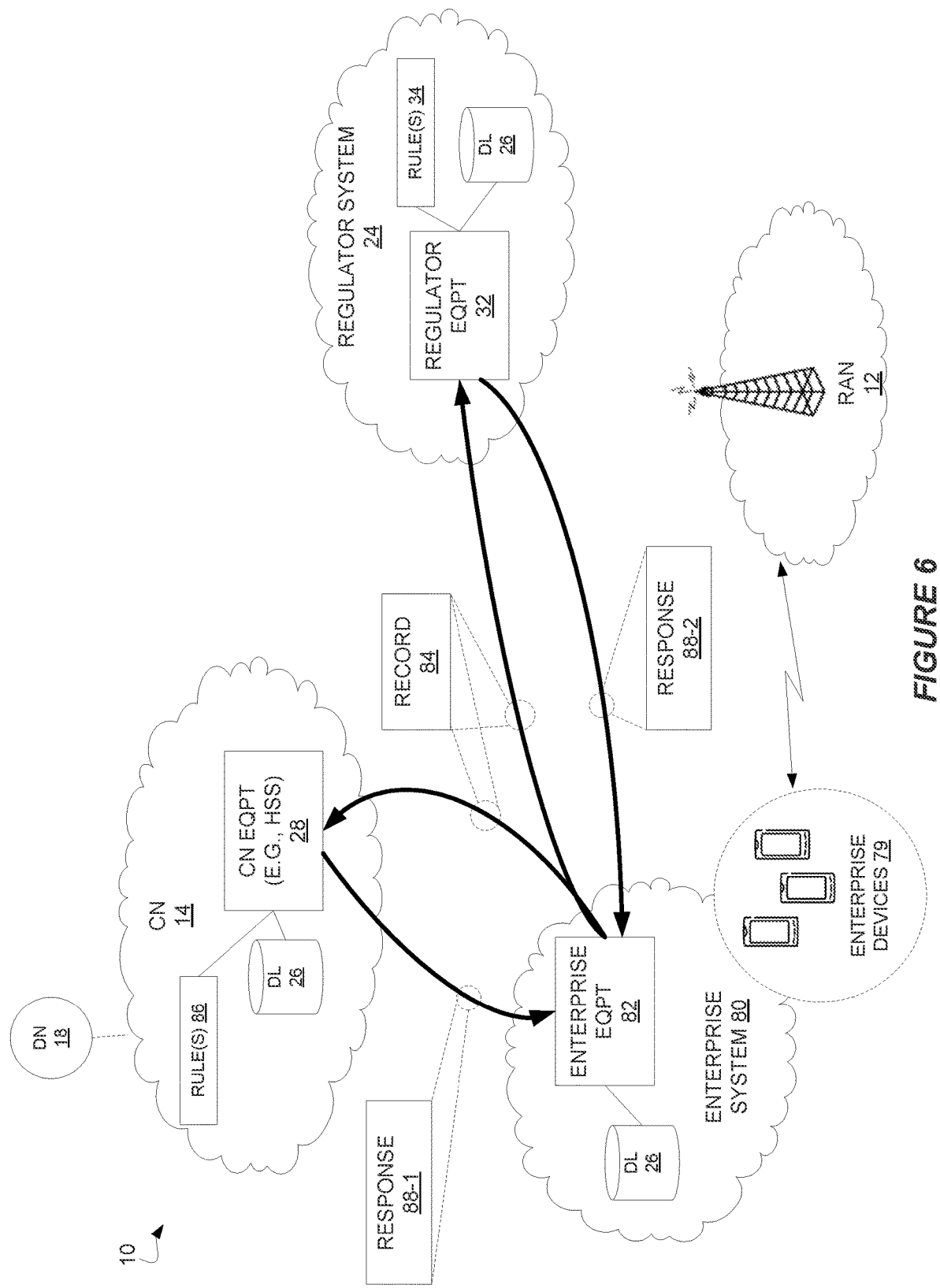
FIG. 6 is a block diagram of an operator system, a regulator system, and an enterprise system according to one or more embodiments.

FIG. 6 illustrates an example of these embodiments. FIG. 6 in this regard shows an enterprise system 80 of an enterprise (e.g., the manufacturer of wireless communication devices 79). As shown, the permissioned distributed database 26 is also distributed at least in part to the enterprise system 80, e.g., the enterprise-tier is distributed between the enterprise system 80, the operator system 10, and the regulator system 24. The enterprise system 80 includes enterprise equipment 82. The enterprise equipment 82 is configured to send, to the operator system 10 of a wireless communication network operator (that has delegated subscription identifier administration to the enterprise system 80) and/or to the regulator system 24, a record 84 that includes information about administration of a subscription identifier by the enterprise system 80. The record 84 may be for instance an enterprise-tier record. The information in the record 84 may indicate the subscription identifier itself, a set of subscription identifiers that includes the subscription identifier, whether and/or when the subscription identifier was assigned to an end user or end device, and/or whether and/or when the subscription identifier was activated for working use, deactivated from working use, suspended from use, etc. The information in the record 84 in some embodiments also includes a timestamp of when the record 84 was created by the enterprise system 80.

In embodiments where the enterprise system 80 sends the record to the operator system 10, the operator system 10 receives the record 84. In some embodiments, the operator system 10 itself verifies whether administration of the subscription identifier as indicated by the record 84 conforms to one or more rules 86 governing administration of subscription identifiers. The one or more rules 86 may for instance require that the subscription identifier indicated by the record 84 is included within a set or range of subscription identifiers to which the operator has delegated administration to the enterprise system 80. Alternatively or additionally, the one or more rules 86 may include one or more rules that are the same as or similar to the rules 34 described previously with respect to FIG. 1, e.g., the rule(s) 86 may specify a format in which the subscription identifier must be administered. Regardless, the operator system 10 in these embodiments approves or rejects the record 84 for addition to the permissioned distributed database 26 (e.g., in the enterprise tier) depending on the operator system's verification and sends a response 88-1 to the enterprise system 80 indicating whether the operator system 10 approves of or rejects the record 84 being added to the distributed database 26. In embodiments where the approval or rejection is for addition to the enterprise tier 26C of the distributed database 26, the operator system 10 effectively participates in the distributed database's consensus protocol for the enterprise tier 26C, e.g., even though the operator system 10 may not participate in the consensus protocol for the operator tier 26B as the consensus for the operator tier 26B may be (exclusively) controlled by the regulator system 24. That is, the operator system's verification is inherently embodied in the distributed database's consensus protocol for the enterprise tier 26C, e.g., so as to exploit the consensus protocol for realizing substantially real-time oversight of the enterprise system's administration. But, as described below, this approval or rejection may be tentative in some embodiments, subject to or in combination with approval or rejection by the regulator system 24.

In particular, alternatively or additionally to the operator system's verification, the regulator system 24 may verify whether administration of the subscription identifier as indicated by the record 84 conforms to one or more rules 34 governing administration of subscription identifiers, in a way similar to that described previously. In this case, the enterprise system 80 sends the record 84 to the regulator system 24, e.g., directly or indirectly via the operator system 10, for the regulator system's verification. The regulator system 24 then approves or rejects the record 84 for addition to the permissioned distributed database 26 depending on the regulator system's verification. The regulator system 24 accordingly sends a response 88-2 to the enterprise system 80 indicating whether the regulator system 24 approves of or rejects the record 84 being added to the permissioned distributed database 26.

Correspondingly, responsive to sending the record 84, the enterprise system 80 receives one or more responses 88 (i.e., response 88-1 and/or 88-2) that indicate whether the operator system 10 and/or the regulator system 24 approves of or rejects the record 84 being added to the permissioned distributed database 26. The enterprise system 80 correspondingly adds or does not add the record 84 to the permissioned distributed database 26 depending on the one or more responses 88. In some embodiments where the enterprise system 80 receives responses 88-1 and 88-2 from both the regulator system 24 and the operator system 10, the enterprise system 80 adds or does not add the record 84 to the permissioned distributed database 26 depending respectively on whether or not both the operator system 10 and the regulator system 24 approves of the record 84 being added to the distributed database 26. That is, both the regulator system 24 and the operator system 10 need to approve of the record 84 being added to the distributed database 26 in this case.

Embodiments that delegate subscription identifier administration in this way may advantageously relieve the operator from at least some of the burden and administrative overhead of subscription identifier administration. Alternatively or additionally, delegation may allow subscription identifiers to be administered (e.g., assigned) more efficiently, quickly, and scalably for working use.

Consider an example in the context of an enterprise that is an automotive manufacturer. Some embodiments enable the enterprise to add wireless connectivity to vehicles even before the vehicles are shipped out of the factory. To this end, the operator system 10 may onboard the enterprise by creating an operator-tier record in the distributed database 26 associated with the enterprise and by linking the operator-tier record to an enterprise-tier record. The operator system 10 may inform the enterprise system 80 of this linking so that the enterprise system 80 knows where to add enterprise-tier records in the distributed database 26. The enterprise system 80 in this regard may create a new enterprise-tier record with a subscription identifier (e.g., 1G1YY22P5R5435719) and send the record to the operator system 10 and/or the regulator system 24 for approval or rejection. Upon approval for addition to the enterprise tier, the enterprise system 80 may add the record to the enterprise-tier in the distributed database 26. Then, the enterprise system 80 may simply create a new tamper-resistant secure hardware component with the subscription identifier and physically install the secure hardware component into a vehicle. This way, when the vehicle is picked up by a dealer to be sold, the vehicle already has a working subscription identifier, e.g., for a working wireless communication connection.

Note that FIGS. 2-6 illustrate embodiments herein with respect to a single wireless communication network operator. Embodiments herein however may be applied in a similar way to one or more other wireless communication network operators.

Figure 7:
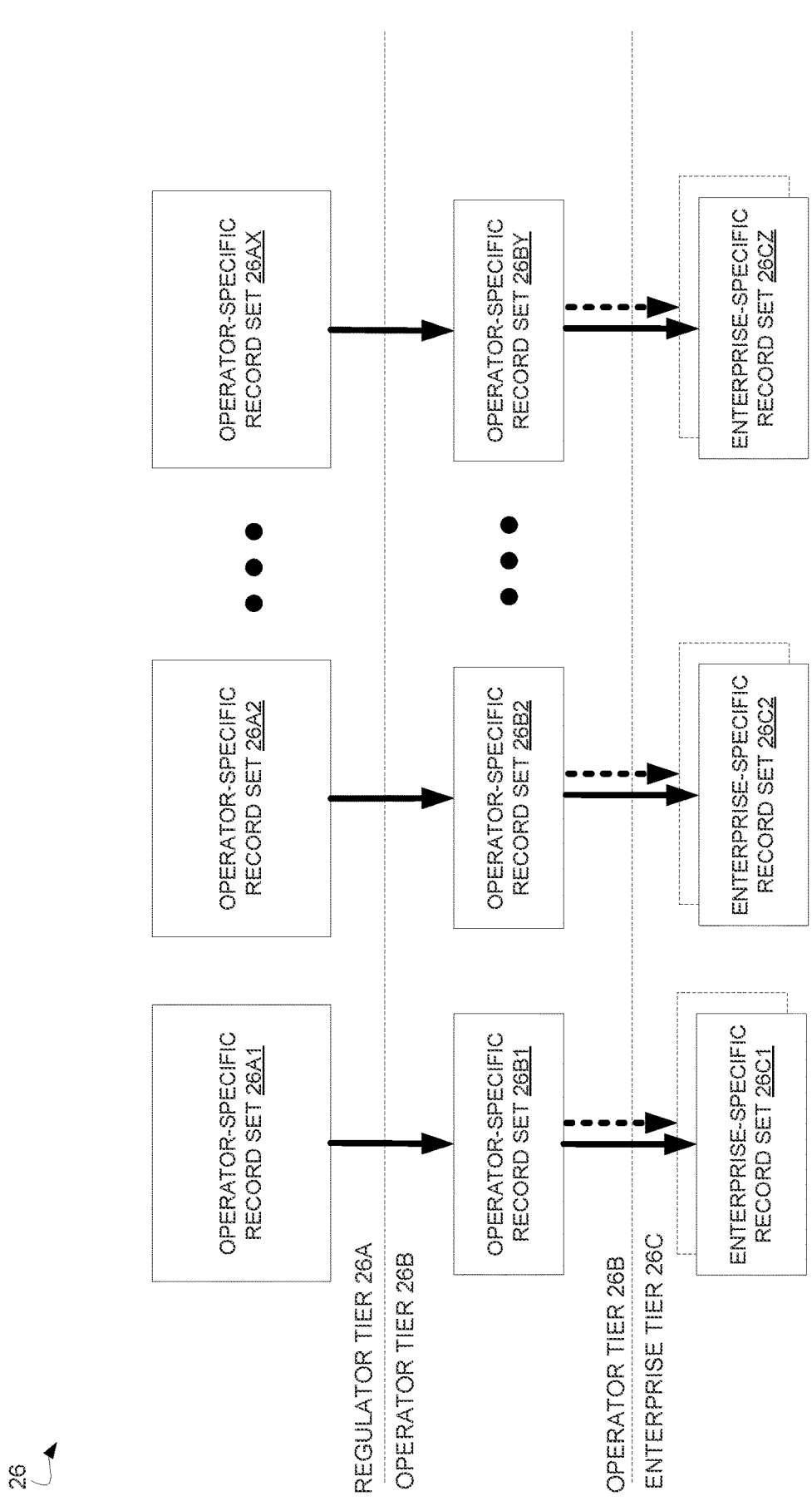
FIG. 7 is a block diagram of records of a permissioned distributed database with a multi-tier structure including information associated with multiple wireless communication network operators according to some embodiments.

FIG. 7 illustrates an example structure of the permissioned distributed database 26 in such a case of multiple operators. As shown, the regulator tier 26A includes multiple sets 26A1, 26A2, . . . 26AX of one or more operator-specific records. Each set contains records with information associated with a specific operator, e.g., as described in FIG. 4, and is linked to a respective set 26ß1, 26B2, . . . 26BY of operator-specific records in the operator tier 26B. Each set of operator-specific record(s) in the operator tier 26B is specific to a certain operator and may include records as shown in FIG. 2, 4, or 5. In embodiments with an enterprise tier 26C, each operator-specific record set 26ß1, 26B2, . . . 26BY in the operator tier 26B is linked to one or more enterprise-specific record sets. As shown, for example, operator-specific record set 26ß1 is linked to one or more enterprise-specific record sets 26C1, operator-specific record set 26ß2 is linked to one or more enterprise-specific record sets 26C2, and operator-specific record set 26BY is linked to one or more enterprise-specific record sets 26CZ. The one or more enterprise-specific record sets associated with a certain operator (e.g., enterprise-specific record set(s) 26C1) may include for instance the record sets 26C-1, 26C-2, . . . 26C-P shown in FIG. 5.

Accordingly, some embodiments advantageously provide flexible and quick (e.g., on demand) subscription identifier administration to operators and/or enterprises. This may mitigate procurement costs from the regulator. From the regulator perspective, some embodiments remove the administrative overhead of having to manage and very requests from operators to administer subscription identifiers, while still allowing regulator oversight over subscription identifier administration.

Note further that although some embodiments have been described with examples where subscription identifiers are MSINs, embodiments herein apply to any type of subscription identifiers that identify subscriptions to receive service from a wireless communication network operator. For example, subscription identifiers in other embodiments may be mobile station international subscriber directory numbers (MSISNs), integrated circuit card identifiers (ICCIDs), or the like.

Figure 8:
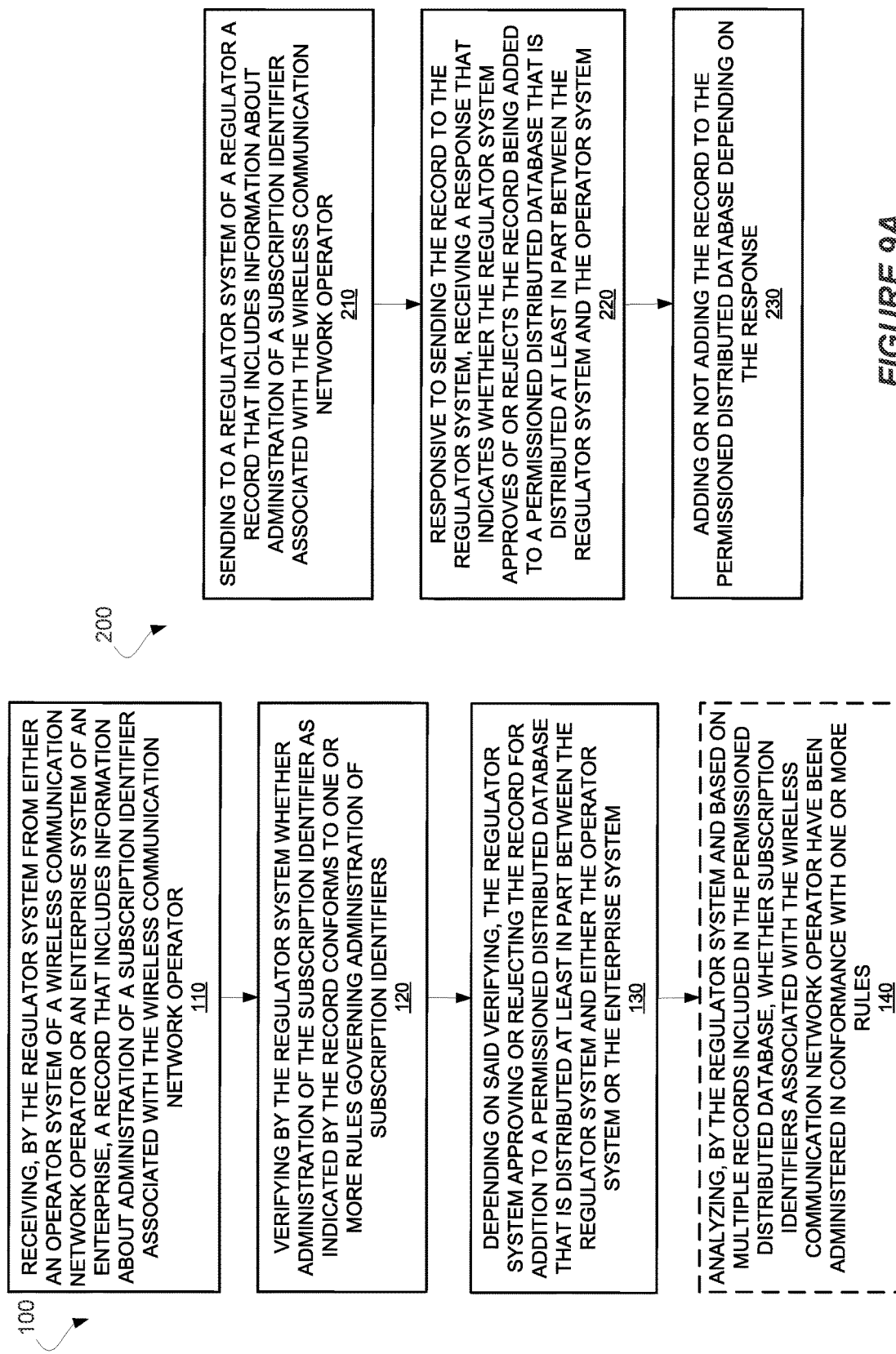
FIG. 8 is a logic flow diagram of a method performed by a regulator system according to some embodiments.

In view of the above modifications as variations, FIG. 8 illustrates a method performed by a regulator system 24 (e.g., via regulator equipment 32) of a regulator for regulating administration of subscription identifiers according to some embodiments. As shown, the method 100 includes receiving, by the regulator system 24 from either an operator system 10 of a wireless communication network operator or an enterprise system 80 of an enterprise, a record 30 or 84 that includes information about administration of a subscription identifier associated with the wireless communication network operator (Block 110). In some embodiments, the method 100 further includes verifying by the regulator system 24 whether administration of the subscription identifier as indicated by the record 30 or 84 conforms to one or more rules 34 governing administration of subscription identifiers (Block 120). The method 100 may also include, depending on the verifying, the regulator system 24 approving or rejecting the record 30 or 84 for addition to a permissioned distributed database 26 that is distributed at least in part between the regulator system 24 and either the operator system 10 or the enterprise system 80 (Block 130). In some embodiments, the method 100 may further include analyzing, by the regulator system 24 and based on multiple records included in the permissioned distributed database 26, whether subscription identifiers associated with the wireless communication network operator have been administered in conformance with one or more rules (Block 140).

Figure 9:
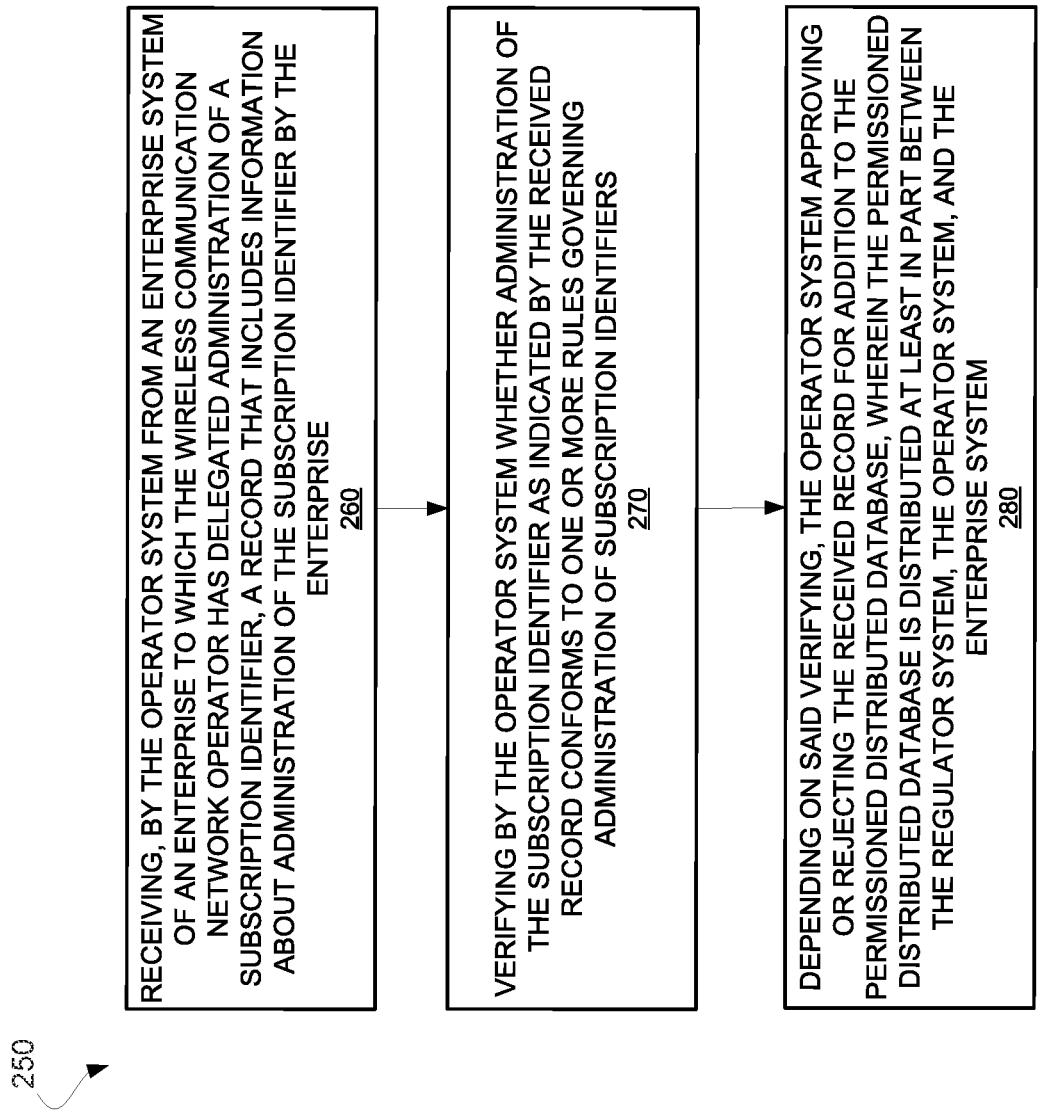
FIG. 9A is a logic flow diagram of a method performed by an operator system according to some embodiments.
FIG. 9B is a logic flow diagram of a method performed by an operator system according to other embodiments.

FIG. 9A illustrates a method performed by an operator system 10 of a wireless communication network operator according to some embodiments. As shown, the method 200 includes sending to a regulator system 24 of a regulator a record 30 that includes information about administration of a subscription identifier associated with the wireless communication network operator (Block 210). The method 200 also includes, responsive to sending the record 30 to the regulator system 24, receiving a response 36 that indicates whether the regulator system 24 approves of or rejects the record 30 being added to a permissioned distributed database 26 that is distributed at least in part between the regulator system 24 and the operator system 10 (Block 220). The method 200 further includes adding or not adding the record 30 to the permissioned distributed database 26 depending on the response 36 (Block 230).

Alternatively or additionally to the method 200 in FIG. 9A, a method performed by an operator system 10 of a wireless communication network operator may include the steps shown in FIG. 9B according to some embodiments. As shown, the method 250 comprises receiving, by the operator system 10 from an enterprise system 80 of an enterprise to which the wireless communication network operator has delegated administration of a subscription identifier, a record 84 that includes information about administration of the subscription identifier by the enterprise (Block 260). The method 250 may also include verifying by the operator system 10 whether administration of the subscription identifier as indicated by the received record 84 conforms to one or more rules governing administration of subscription identifiers (Block 270). The method 250 may further include, depending on said verifying, the operator system 10 approving or rejecting the received record for addition to the permissioned distributed database 26 (Block 280). In this case, the permissioned distributed database 26 may be distributed at least in part between the regulator system 24, the operator system 10, and the enterprise system 80.

Figure 10:
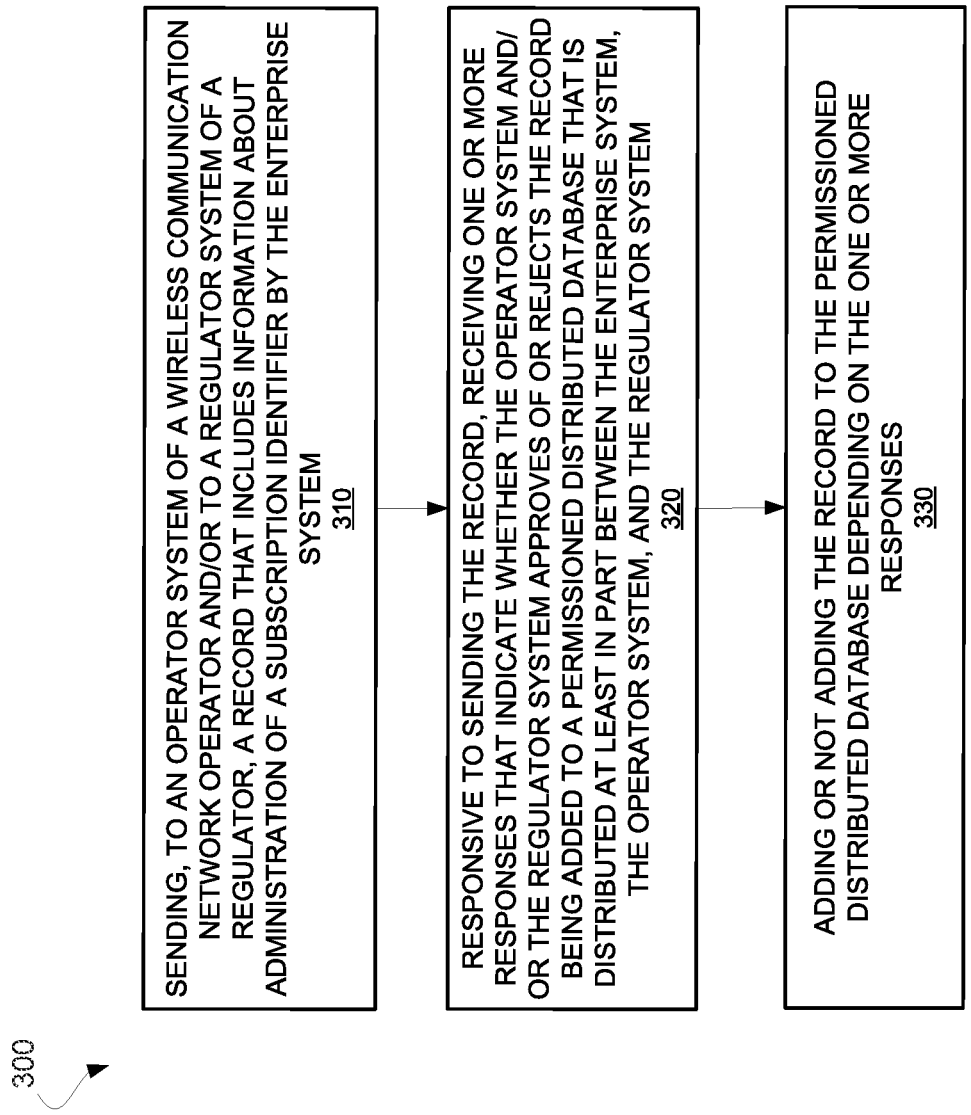
FIG. 10 is a logic flow diagram of a method performed by an enterprise system according to some embodiments.

FIG. 10 illustrates a method performed by an enterprise system 80 of an enterprise to which a wireless communication system operator delegates administration of a subscription identifier according to some embodiments. As shown, the method 300 includes sending, to an operator system 10 of the wireless communication network operator and/or to a regulator system 24 of a regulator, a record 84 that includes information about administration of a subscription identifier by the enterprise system 80 (Block 310). The method 300 also includes, responsive to sending the record 84, receiving one or more responses 88 (e.g., 88-1 and/or 88-2) that indicate whether the operator system 10 and/or a regulator system 24 of a regulator approves of or rejects the record 84 being added to a permissioned distributed database 26 that is distributed at least in part between the enterprise system 80, the operator system 10, and the regulator system 24 (Block 320). The method 300 further includes adding or not adding the record 84 to the permissioned distributed database 26 depending on the one or more responses 88 (Block 330).

Note that core network equipment 28 herein is any type of node in the CN 14 (e.g., implementing an HSS). A user equipment 16 is any type device capable of communicating with a radio network node over radio signals. A user equipment 16 may therefore refer to a mobile terminal, a wireless device, a machine-to-machine (M2M) device, a machine-type communications (MTC) device, a NB-IoT device, etc. Accordingly, it should be noted that the UE does not necessarily have a "user" in the sense of an individual person owning and/or operating the device. A user equipment 16 may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a user equipment 16 as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a user equipment 16 as described herein may be comprised in a vehicle and may perform monitoring and/or reporting of the vehicle's operational status or other functions associated with the vehicle.

Note that the regulator system 24 (e.g., regulator equipment 32) as described above may perform the processing herein by implementing any functional means or units. In one embodiment, for example, the regulator system 24 (e.g., regulator equipment 32) comprises respective circuits configured to perform the steps shown in FIG. 8. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein. That is, in some embodiments memory of regulator system 24 (e.g., regulator equipment 32) contains instructions executable by the processing circuitry such that the regulator system 24 (e.g., regulator equipment 32) is configured to carry out the processing herein. The memory may additionally or alternatively be configured for realizing the permissioned distributed database 26.

Figure 11A:
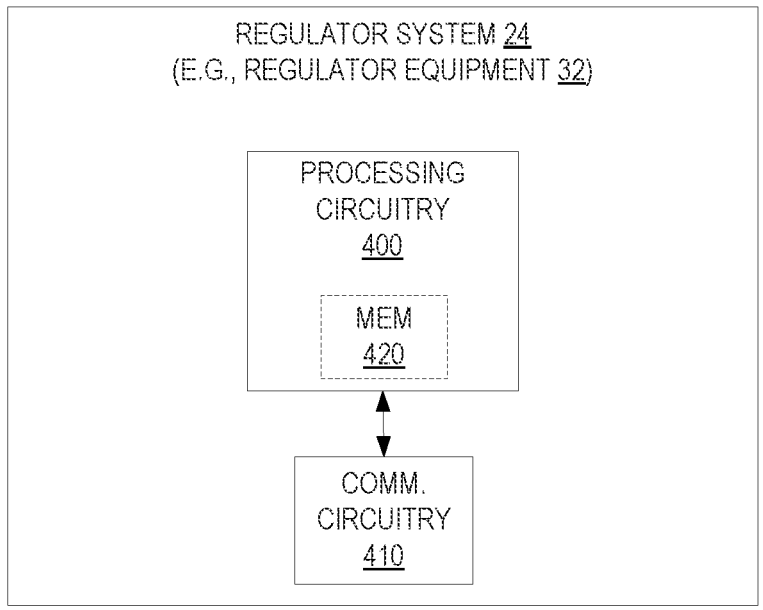
FIG. 11A is a block diagram of a regulator system according to some embodiments.

FIG. 11A illustrates additional details of regulator system 24 (e.g., regulator equipment 32) in accordance with one or more embodiments. As shown, the regulator system 24 (e.g., regulator equipment 32) includes processing circuitry 400 and communication circuitry 410. The communication circuitry 410 is configured to communication with one or more other nodes, e.g., the operator system 10. The processing circuitry 400 is configured to perform processing described above, e.g., in FIG. 8, such as by executing instructions stored in memory 420. The memory 420 may alternatively or additionally be configured to store information of the permissioned distributed database 26. The processing circuitry 400 in this regard may implement certain functional means or units.

Figure 11B:
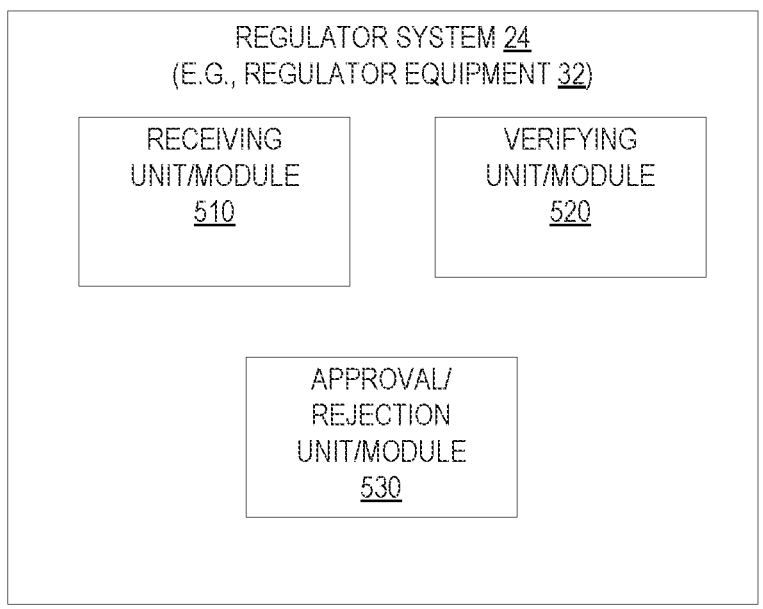
FIG. 11B is a block diagram of a regulator system according to other embodiments.

FIG. 11B in this regard illustrates regulator system 24 (e.g., regulator equipment 32) in accordance with one or more other embodiments. As shown, the regulator system 24 (e.g., regulator equipment 32) may include a receiving unit or module 510 for receiving, by the regulator system 24 from either an operator system 10 of a wireless communication network operator or an enterprise system 80 of an enterprise, a record 30 or 84 that includes information about administration of a subscription identifier associated with a wireless communication network operator. Also included may be a verifying unit or module 520 for verifying by the regulator system 24 whether administration of the subscription identifier as indicated by the record 30 or 84 conforms to one or more rules 34 governing administration of subscription identifiers. Further included may be an approval/rejection unit or module 530 for, depending on the verifying, approving or rejecting the record 30 or 84 for addition to a permissioned distributed database 26 that is distributed at least in part between the regulator system 24 and either the operator system 10 or the enterprise system 80. These modules or units may be implemented by the processing circuit(s) 400 of FIG. 11A.

Similarly note that the operator system 10 (e.g., CN equipment 28) as described above may perform the processing herein by implementing any functional means or units. In one embodiment, for example, the operator system 10 (e.g., CN equipment 28) comprises respective circuits configured to perform the steps shown in FIG. 9. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein. That is, in some embodiments memory of operator system 10 (e.g., CN equipment 28) contains instructions executable by the processing circuitry such that the operator system 10 (e.g., CN equipment 28) is configured to carry out the processing herein. The memory may additionally or alternatively be configured for realizing the permissioned distributed database 26.

Figure 12A:
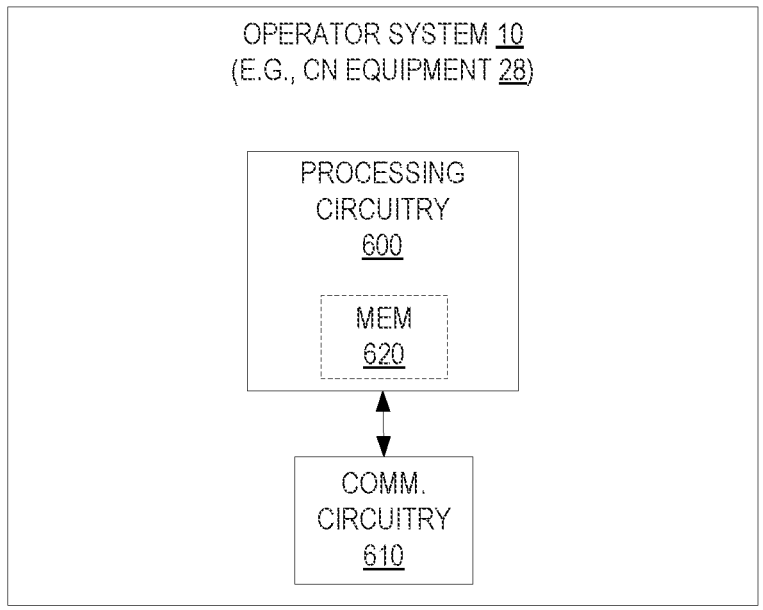
FIG. 12A is a block diagram of an operator system according to some embodiments.

FIG. 12A illustrates additional details of operator system 10 (e.g., CN equipment 28) in accordance with one or more embodiments. As shown, the operator system 10 (e.g., CN equipment 28) includes processing circuitry 600 and communication circuitry 610. The communication circuitry 610 is configured to communication with one or more other nodes, e.g., the regulator system 24 and/or enterprise system 80. The processing circuitry 600 is configured to perform processing described above, e.g., in FIGS. 9A and/or 9B, such as by executing instructions stored in memory 620. The memory 620 may alternatively or additionally be configured to store information of the permissioned distributed database 26. The processing circuitry 600 in this regard may implement certain functional means or units.

Figure 12B:
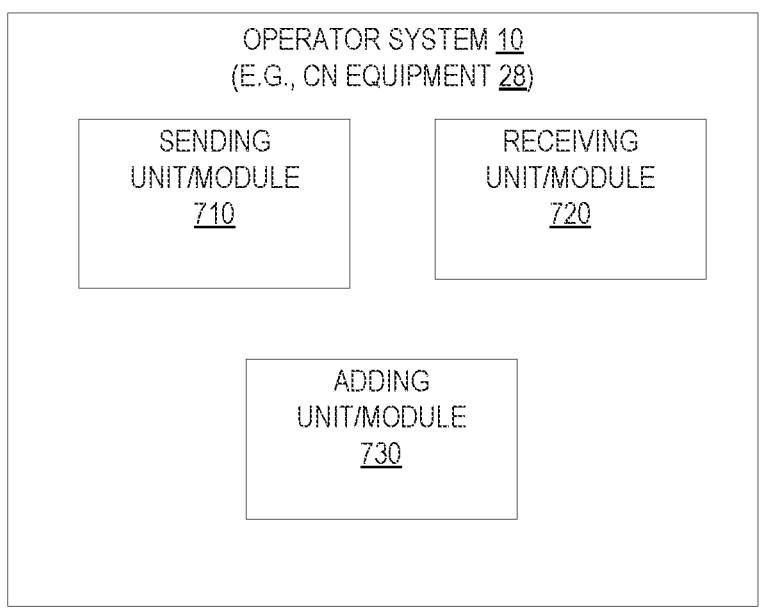
FIG. 12B is a block diagram of an operator system according to other embodiments.

FIG. 12B in this regard illustrates operator system 10 (e.g., CN equipment 28) in accordance with one or more other embodiments. As shown, the operator system 10 (e.g., CN equipment 28) may include a sending unit or module 710 for sending to a regulator system 24 of a regulator a record 30 that includes information about administration of a subscription identifier associated with the wireless communication network operator. Also included may be a receiving unit or module 720 for, responsive to sending the record 30 to the regulator system 24, receiving a response 36 that indicates whether the regulator system 24 approves of or rejects the record 30 being added to a permissioned distributed database 26 that is distributed at least in part between the regulator system 24 and the operator system 10. Further included may be an adding unit or module 730 for adding or not adding the record 30 to the permissioned distributed database 26 depending on the response 36. These modules or units may be implemented by the processing circuit(s) 600 of FIG. 12A.

Figure 12C:
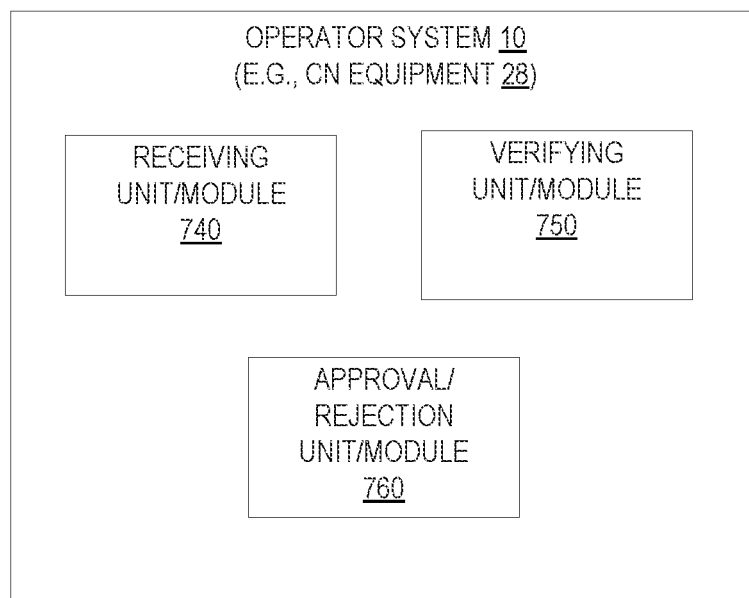
FIG. 12C is a block diagram of an operator system according to still other embodiments.

Alternatively or additionally, FIG. 12C illustrates operator system 10 (e.g., CN equipment 28) in accordance with one or more other embodiments. As shown, the operator system 10 (e.g., CN equipment 28) may include a receiving unit or module 740 for receiving, from an enterprise system 80 of an enterprise to which the wireless communication network operator has delegated administration of a subscription identifier, a record 84 that includes information about administration of the subscription identifier by the enterprise. Also included may be a verifying unit or module 750 for verifying whether administration of the subscription identifier as indicated by the received record 84 conforms to one or more rules governing administration of subscription identifiers. Further included may be an approval or rejection unit or module 760 for, depending on said verifying, approving or rejecting the received record 84 for addition to the permissioned distributed database 26. In this case, the permissioned distributed database 26 may be distributed at least in part between the regulator system 24, the operator system 10, and the enterprise system 80. These modules or units may be implemented by the processing circuit(s) 600 of FIG. 12A.

Also note that the enterprise system 80 (e.g., enterprise equipment 82) as described above may perform the processing herein by implementing any functional means or units. In one embodiment, for example, the enterprise system 80 (e.g., enterprise equipment 82) comprises respective circuits configured to perform the steps shown in FIG. 10. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein. That is, in some embodiments memory of enterprise system 80 (e.g., enterprise equipment 82) contains instructions executable by the processing circuitry such that the enterprise system 80 (e.g., enterprise equipment 82) is configured to carry out the processing herein. The memory may additionally or alternatively be configured for realizing the permissioned distributed database 26.

Figure 13A:
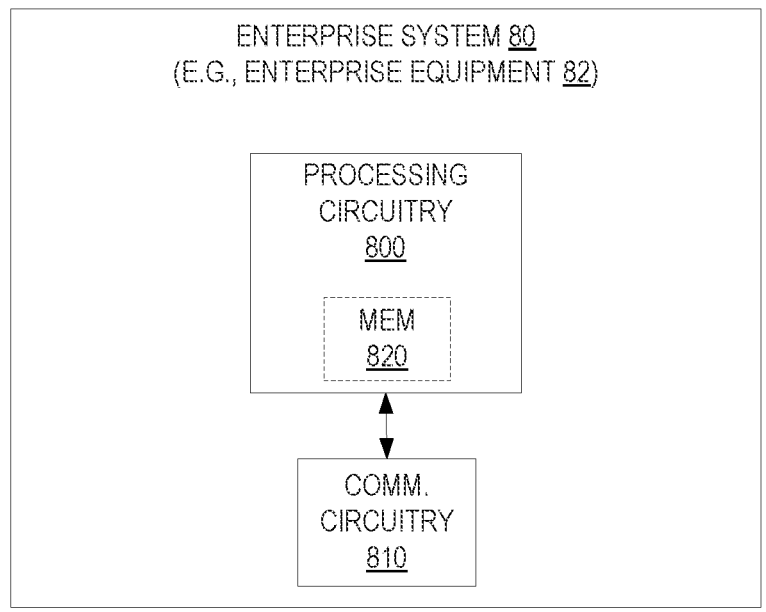
FIG. 13A is a block diagram of an enterprise system according to some embodiments.

FIG. 13A illustrates additional details of enterprise system 80 (e.g., enterprise equipment 82) in accordance with one or more embodiments. As shown, the enterprise system 80 (e.g., enterprise equipment 82) includes processing circuitry 800 and communication circuitry 810. The communication circuitry 810 is configured to communication with one or more other nodes, e.g., the regulator system 24 and/or operator system 10. The processing circuitry 800 is configured to perform processing described above, e.g., in FIG. 10, such as by executing instructions stored in memory 820. The memory 820 may alternatively or additionally be configured to store information of the permissioned distributed database 26. The processing circuitry 800 in this regard may implement certain functional means or units.

Figure 13B:
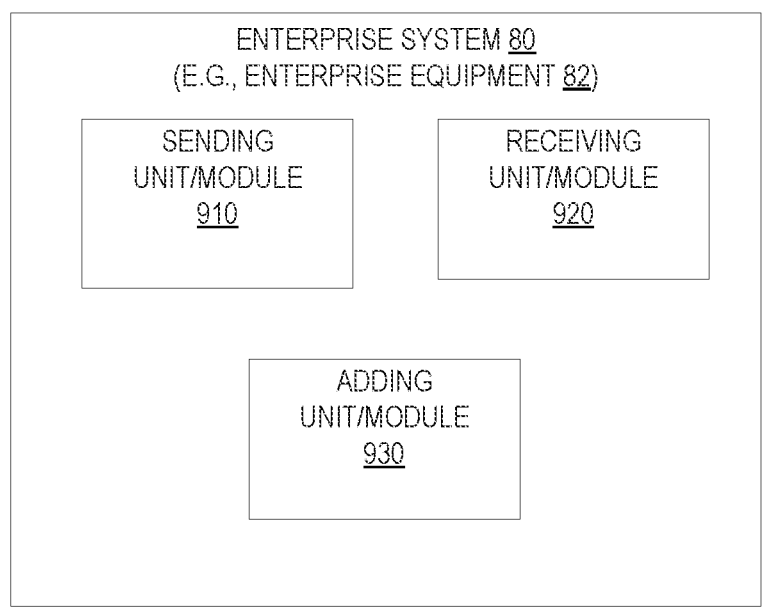
FIG. 13B is a block diagram of an enterprise system according to other embodiments.

FIG. 13B in this regard illustrates enterprise system 80 (e.g., enterprise equipment 82) in accordance with one or more other embodiments. As shown, the enterprise system 80 (e.g., enterprise equipment 82) may include a sending unit or module 910 for sending, to an operator system 10 of a wireless communication network operator and/or to a regulator system 24 of a regulator, a record 84 that includes information about administration of a subscription identifier by the enterprise system 80. Also included may be a receiving unit or module 920 for, responsive to sending the record 84, receiving one or more responses 88 that indicate whether the operator system 10 and/or the regulator system 24 approves of or rejects the record 84 being added to a permissioned distributed database 26 that is distributed at least in part between the regulator system 24, the enterprise system 80, and the operator system 10. Further included may be an adding unit or module 930 for adding or not adding the record 84 to the permissioned distributed database 26 depending on the one or more responses 88. These modules or units may be implemented by the processing circuit(s) 800 of FIG. 13A.

Those skilled in the art will also appreciate that embodiments herein further include corresponding computer programs.

A computer program comprises instructions which, when executed on at least one processor of equipment or system, cause the equipment or system to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

What is claimed is:

1. A method performed by an operator system of a wireless communication network operator, the method comprising:
    verifying whether administration of a subscription identifier associated with the wireless communication network operator conforms to one or more rules governing administration of subscription identifiers;
    sending, to a regulator system of a regulator, a record that includes information about administration of the subscription identifier;
    responsive to sending the record to the regulator system, receiving a response that indicates whether the regulator system approves of or rejects the record being added to a permissioned distributed database; and
    adding or not adding the record to the permissioned distributed database depending on the response, wherein:
        the permissioned distributed database includes a regulator tier, an operator tier, and an enterprise tier;
        a set of one or more regulator-tier records in the regulator tier includes information associated with the wireless communication network operator;
        the set of one or more regulator-tier records is linked to a set of one or more operator-tier records in the operator tier;
        the set of one or more operator-tier records includes information associated with one or more enterprises to which the wireless communication network operator has delegated administration of respective sets of subscription identifiers;
        the set of one or more operator-tier records is linked to a set of one or more enterprise-tier records in the enterprise tier;
        the set of one or more enterprise-tier records includes information about administration of subscription identifiers as delegated by the wireless communication network operator to the one or more enterprises; and
        the enterprise tier of the permissioned distributed database is distributed between the operator system and an enterprise system.

2. The method of claim 1, wherein the record comprises an indication of the subscription identifier.

3. The method of claim 1, wherein the record comprises an indication of a set of subscription identifiers that includes the subscription identifier.

4. The method of claim 1, wherein the record comprises an indication of whether and/or when the subscription identifier was assigned to an end user or end device.

5. The method of claim 1, wherein the record comprises an indication of whether and/or when the subscription identifier was activated for working use.

6. The method of claim 1, wherein:
    the record is an enterprise-tier record;
    the method further comprises receiving the record from the enterprise system;
    the enterprise system is of an enterprise to which the wireless communication network operator has delegated administration of the subscription identifier;
    the information about administration of the subscription identifier comprises information about administration of the subscription identifier by the enterprise; and
    sending the record to the regulator system depends on the verifying.

7. A operator system for a wireless communication network operator, the operator system comprising:
    processing circuitry and a memory storing instructions executable by the processing circuitry whereby the operator system is configured to:
        verify whether administration of a subscription identifier associated with the wireless communication network operator conforms to one or more rules governing administration of subscription identifiers;
        send, to a regulator system of a regulator, a record that includes information about administration of a subscription identifier;
        responsive to sending the record to the regulator system, receive a response that indicates whether the regulator system approves of or rejects the record being added to a permissioned distributed database; and
        add or not add the record to the permissioned distributed database depending on the response;
    wherein the permissioned distributed database includes a regulator tier, an operator tier, and an enterprise tier;
    wherein a set of one or more regulator-tier records in the regulator tier includes information associated with the wireless communication network operator;
    wherein the set of one or more regulator-tier records is linked to a set of one or more operator-tier records in the operator tier;
    wherein the set of one or more operator-tier records includes information associated with one or more enterprises to which the wireless communication network operator has delegated administration of respective sets of subscription identifiers;
    wherein the set of one or more operator-tier records is linked to a set of one or more enterprise-tier records in the enterprise tier;
    wherein the set of one or more enterprise-tier records includes information about administration of subscription identifiers as delegated by the wireless communication network operator to the one or more enterprises; and
    wherein the enterprise tier of the permissioned distributed database is distributed between the operator system and an enterprise system.

8. The operator system of claim 7, wherein the record comprises an indication of the subscription identifier.

9. The operator system of claim 7, wherein the record comprises an indication of a set of subscription identifiers that includes the subscription identifier.

10. The operator system of claim 7, wherein the record comprises an indication of whether and/or when the subscription identifier was assigned to an end user or end device.

11. The operator system of claim 7, wherein the record comprises an indication of whether and/or when the subscription identifier was activated for working use.

12. The operator system of claim 7, wherein:
the record is an enterprise-tier record;
the operator system is further configured to receive the record from the enterprise system;
the enterprise system is of an enterprise to which the wireless communication network operator has delegated administration of the subscription identifier;
the information about administration of the subscription identifier comprises information about administration of the subscription identifier by the enterprise; and
the operator system is configured to send the record to the regulator system depending on the verifying.

13. A non-transitory computer readable medium storing a computer program product for controlling an operator system of a wireless communication network operator, the computer program product comprising software instructions that, when run on the operator system, cause the operator system to:
verify whether administration of a subscription identifier associated with the wireless communication network operator conforms to one or more rules governing administration of subscription identifiers;
send, to a regulator system of a regulator, a record that includes information about administration of the subscription identifier;
responsive to sending the record to the regulator system, receive a response that indicates whether the regulator system approves of or rejects the record being added to a permissioned distributed database; and
add or not add the record to the permissioned distributed database depending on the response, wherein:
the permissioned distributed database includes a regulator tier, an operator tier, and an enterprise tier;
a set of one or more regulator-tier records in the regulator tier includes information associated with the wireless communication network operator;
the set of one or more regulator-tier records is linked to a set of one or more operator-tier records in the operator tier;
the set of one or more operator-tier records includes information associated with one or more enterprises to which the wireless communication network operator has delegated administration of respective sets of subscription identifiers;
the set of one or more operator-tier records is linked to a set of one or more enterprise-tier records in the enterprise tier;
the set of one or more enterprise-tier records includes information about administration of subscription identifiers as delegated by the wireless communication network operator to the one or more enterprises; and
the enterprise tier of the permissioned distributed database is distributed between the operator system and an enterprise system.

* * * * *